United States Patent
Alleshouse

(10) Patent No.: US 9,418,322 B2
(45) Date of Patent: Aug. 16, 2016

(54) XML PRINTER SYSTEM WITH RFID CAPABILITY

(71) Applicant: ZIH Corp., Lincolnshire, IL (US)

(72) Inventor: Bruce N. Alleshouse, Wilmette, IL (US)

(73) Assignee: ZIH CORP., Lincolnshire, IL (US)

( * ) Notice: Subject to any disclaimer, the term of this patent is extended or adjusted under 35 U.S.C. 154(b) by 0 days.

(21) Appl. No.: 14/445,196

(22) Filed: Jul. 29, 2014

(65) Prior Publication Data

US 2014/0355028 A1 Dec. 4, 2014

Related U.S. Application Data

(63) Continuation of application No. 13/760,716, filed on Feb. 6, 2013, now Pat. No. 8,820,642, which is a continuation of application No. 13/157,973, filed on Jun. 10, 2011, now Pat. No. 8,393,540, which is a (Continued)

(51) Int. Cl.
*G06K 7/10* (2006.01)
*G06K 15/02* (2006.01)
*G06K 1/12* (2006.01)
*G06F 3/12* (2006.01)

(52) U.S. Cl.
CPC .......... *G06K 15/1813* (2013.01); *G06F 3/1284* (2013.01); *G06F 3/1298* (2013.01); *G06K 1/121* (2013.01); *G06K 15/02* (2013.01); *G06K 2215/0011* (2013.01)

(58) Field of Classification Search
USPC ............. 235/462.01, 462.08, 462.15, 462.19, 235/375
See application file for complete search history.

(56) References Cited

U.S. PATENT DOCUMENTS

| | | |
|---|---|---|
| 5,372,439 A | 12/1994 | Poole et al. |
| 5,527,407 A | 6/1996 | Gartland et al. |
| 5,860,068 A | 1/1999 | Cook |
| 6,154,378 A | 11/2000 | Peterson et al. |
| 6,226,675 B1 | 5/2001 | Meltzer et al. |
| 6,246,326 B1 | 6/2001 | Wiklof et al. |
| 6,289,501 B1 | 9/2001 | Mutschler, III |

(Continued)

FOREIGN PATENT DOCUMENTS

| | | |
|---|---|---|
| CN | 1287922 A | 3/2001 |
| CN | 1409668 A | 4/2003 |

(Continued)

OTHER PUBLICATIONS

Anderegg, J.U.; "SVG and Image "Caching"—Page Fore-/Backgrounds—Transparency" FOP-DEV Mailing List Jan. 24, 2003, Downloaded at: http://mail-archives.apache.org/mod_mbox/xmlgraphics-fop-dev/200301.mbox/%3cLOEDKBFMB-BGFAPEJNBCOEEAACHAA.hansuli.anderegg@bluewin.ch%3e; Jul. 14, 2010; 3 sheets.

(Continued)

*Primary Examiner* — Ahshik Kim

(57) ABSTRACT

An XML system is configured to encode RFID devices embedded in media, based upon an extensible markup language (XML) input data stream. The computer system further includes an XML processor configured to receive and process a format template, associate the XML data contained in the XML input data stream and the format template, a formatting engine configured to format the associated XML data according to a format governed by the format template, and/or generate encoding information for an RFID device.

33 Claims, 9 Drawing Sheets

Related U.S. Application Data continuation of application No. 12/551,953, filed on Sep. 1, 2009, now Pat. No. 7,988,051, which is a continuation of application No. 10/505,982, filed on Mar. 28, 2006, now Pat. No. 7,600,685, which is a continuation-in-part of application No. 10/332,604, filed on Oct. 20, 2003, now Pat. No. 7,025,268, which is a continuation-in-part of application No. 10/197,014, filed on Jul. 17, 2002, now Pat. No. 6,540,142.

(60) Provisional application No. 60/345,389, filed on Jan. 4, 2002, provisional application No. 60/341,427, filed on Dec. 17, 2001.

(56) References Cited

U.S. PATENT DOCUMENTS

| | | | |
|---|---|---|---|
| 6,305,605 | B1 | 10/2001 | Goetz et al. |
| 6,449,620 | B1 | 9/2002 | Draper et al. |
| 6,457,883 | B1 | 10/2002 | Silverbrook et al. |
| 6,487,566 | B1 | 11/2002 | Sundaresan |
| 6,507,856 | B1 | 1/2003 | Chen et al. |
| 6,539,422 | B1 | 3/2003 | Hunt et al. |
| 6,540,142 | B1 | 4/2003 | Alleshouse |
| 6,568,596 | B1 | 5/2003 | Shaw |
| 6,600,418 | B2 | 7/2003 | Francis et al. |
| 6,655,593 | B2 | 12/2003 | Alleshouse |
| 6,757,869 | B1 | 6/2004 | Li |
| 6,764,009 | B2 | 7/2004 | Melick et al. |
| 6,793,127 | B2 | 9/2004 | Alsafadi et al. |
| 6,857,714 | B2 | 2/2005 | Hohberger et al. |
| 6,901,403 | B1 | 5/2005 | Bata |
| 6,908,034 | B2 | 6/2005 | Alleshouse |
| 6,925,631 | B2 | 8/2005 | Golden |
| 7,025,268 | B2 | 4/2006 | Alleshouse |
| 7,126,716 | B1 | 10/2006 | Kaufman et al. |
| 7,146,614 | B1 | 12/2006 | Nikols |
| 7,172,122 | B2 | 2/2007 | Alleshouse |
| 7,267,279 | B2 | 9/2007 | Melick et al. |
| 7,339,690 | B2 | 3/2008 | Lenz et al. |
| 7,407,102 | B2 | 8/2008 | Alleshouse |
| 7,600,685 | B2 | 10/2009 | Alleshouse |
| 7,630,908 | B1 | 12/2009 | Amrien et al. |
| 7,733,509 | B2 | 6/2010 | Buis et al. |
| 7,959,082 | B2 | 6/2011 | Alleshouse |
| 7,959,083 | B2 | 6/2011 | Alleshouse |
| 7,988,051 | B2 | 8/2011 | Alleshouse |
| 8,393,540 | B2 | 3/2013 | Alleshouse |
| 8,459,555 | B2 | 6/2013 | Alleshouse |
| 8,820,642 | B2 * | 9/2014 | Alleshouse ............... 235/462.01 |
| 9,201,845 | B2 | 12/2015 | Alleshouse |
| 2002/0112224 | A1 | 8/2002 | Cox |
| 2003/0058469 | A1 | 3/2003 | Buis et al. |
| 2003/0061947 | A1 | 4/2003 | Hohberger et al. |
| 2003/0090712 | A1 | 5/2003 | Lenz et al. |
| 2003/0136841 | A1 | 7/2003 | Alleshouse |
| 2004/0243931 | A1 | 12/2004 | Stevens |
| 2005/0246694 | A1 | 11/2005 | Soderberg et al. |
| 2005/0262049 | A1 | 11/2005 | Somppi |
| 2005/0273772 | A1 | 12/2005 | Matsaakis |
| 2006/0138227 | A1 | 6/2006 | Alleshouse |
| 2006/0249566 | A1 | 11/2006 | Alleshouse |

FOREIGN PATENT DOCUMENTS

| | | |
|---|---|---|
| CN | 1605081 B | 3/2011 |
| GB | 2359645 | 8/2001 |
| JP | 2002-103746 | 4/2002 |
| JP | 2002-108850 A | 4/2002 |
| TW | 0578064 | 3/2004 |
| WO | WO 01/06345 A | 1/2001 |
| WO | WO 01/30581 A1 | 5/2001 |
| WO | WO 02/082363 AI | 10/2002 |
| WO | WO 03/052658 A1 | 6/2003 |
| WO | WO 2005/122057 A1 | 12/2005 |

OTHER PUBLICATIONS

Böhm, Klemens; "On Extending the XML Engine with Query-Processing Capabilities"; Proceedings of the IEEE Advances in Digital Libraries; 2000; IEEE Computer Society Washington, DC, USA; May 2000;pp. 127-138.

Kay M., "XSLT Part 2—How Does XSLIT Transform XML?", Internet Citation, http://web.archive.org/web/20011124080629/http://tutorials.beginners.co.uk/read/id/143; Nov. 24, 2001 (retrieved on May 25, 2004).

Sandstrom, A: "Announce: FOP 0.16 Release" XSL-List Mailing List Jan. 2, 2001; Downloaded at: URL:http://xml.coverpages.org/fop16-Ann.html; Jul. 14, 2010; 2 sheets.

Schneider, B., "Dynamic Web Presentation with Java and XSLT"; [Online]; [Retrieved on Nov. 22, 2006]; Retrieved from the Internet <URL:http://www.eveandersson.com/arsdigita/asj/xslt; XP002408527; Jun. 5, 2001; 8 pages.

Application Development Trends Apr. 1999, XML The Last Silver Bullet, J. Vaughan (4 page magazine article).

Auto-ID Center Uses Physical Markup Language in Radio Frequency Identification (RFID) Tag Technology, Cover Pages, http://xml.coverpages.org/ni2001-11-21-c.html, created Nov. 21, 2001.

Chicago Tribune, Dec. 4, 2000, New Computer Language to Streamline Business-to-Business e-commerce (1 page).

Infoworld, Sep. 4, 2000, www.infoworld.com, EDI-to-XML Conversions Getting. A Boost, Ephraim Schwartz (1 page magazine article).

International Business Machines Corporation, "A Process for Optimized Application of XSL Stylesheets for Use With Partially Static XML Data Streams", Research Disclosure, Mason Publications, whole document, Apr. 2000 , vol. 432, No. 179.

JetForm XFA—JetForm XML Forms Architecture XFA.ORG (17 page power point presentation). Applicant submits that it was aware of this document more than one year prior to the filing of the above-identified patent application.

JetForm XML Forms Architecture XFA.COM, file://D:\JetForm%20XML%20Forms%20Architecture %20SFA_Com.htm (10 page website article). Applicant submits that it was aware of this document more than one year prior to the filing of the above-identified patent application.

2 pages entitled Toshiba TEC Corporation—Toshiba TEC introduces B-482 with the following invaluable network capability. (1999) Applicant submits that it was aware of the product more than one year prior to the filing of the above-identified patent application.

1 page entitled Welcome—Toshiba TEC Corporation—Toshiba TEC Thermal Transfer Printer B-482: Vertual experienc (sic) (1999) Applicant submits that it was aware of the product more than one year prior to the filing of the above-identified patent application.

Toshiba TEC Corporation Bar Code Systems Engineering Dept., Web Printer XML Function, Sep. 20, 2000 (7 page power point presentation).

X Marks The Spot, Apr. 1999; D.Andrews, website article http://www.idsystems.corn/reader/1999_04 infolink/xml10499.htm (3 page website article).

Search Report for European Patent Application No. 10 18 4234 dated Jan. 21, 2011.

Extended Search Report for European Patent Application No. 10 18 3493 completed Mar. 18, 2011.

Extended Search Report for European Patent Application No. 10 18 9303 completed Jul. 12, 2011.

Office Action from European Application No. 02789602, dated Aug. 8, 2012.

Office Action from European Application No. 04752504, dated Aug. 8, 2012.

International Preliminary Examination Report for Application No. PCT/US2002/036322; dated Jul. 17, 2003.

International Search Report and Written Opinion for Application No. PCT/2004/015499, dated May 6, 2005.

International Search Report — International Application No. PCT/US02/36322, dated Dec. 19, 2002.

Office Action for U.S. Appl. No. 11/561,084 dated Mar. 16, 2010.

Office Action for U.S. Appl. No. 11/561,084 dated Aug. 3, 2010.

(56) References Cited

OTHER PUBLICATIONS

Notice of Allowance for U.S. Appl. No. 11/561,084 dated Jan. 28, 2011.
Office Action for U.S. Appl. No. 11/774,152 dated Apr. 13, 2010.
Office Action for U.S. Appl. No. 11/774,152 dated Aug. 4, 2010.
Notice of Allowance for U.S. Appl. No. 11/774,152 dated Feb. 9, 2011.
Office Action for U.S. Appl. No. 12/551,953 dated Mar. 1, 2010.
Office Action for U.S. Appl. No. 12/551,953 dated Sep. 29, 2010.
Notice of Allowance for U.S. Appl. No. 12/551,953 dated Mar. 23, 2011.
Office Action for U.S. Appl. No. 13/102,614 dated Jun. 14, 2012.
Office Action for U.S. Appl. No. 13/102,614 dated Sep. 26, 2012.
Notice of Allowance for U.S. Appl. No. 13/102,614 dated Feb. 12, 2013.
Office Action for U.S. Appl. No. 13/157,973 dated Jun. 7, 2012.
Notice of Allowance for U.S. Appl. No. 13/157,973 dated Nov. 26, 2012.
Office Action for U.S. Appl. No. 13/160,037 dated Jan. 27, 2012.
First Notice of Allowance for U.S. Appl. No. 13/160,037 dated Jun. 11, 2012.
Office Action for U.S. Appl. No. 13/160,037 dated Nov. 23, 2012.
Final Notice of Allowance for U.S. Appl. No. 13/160,037 dated May 29, 2013.
Office Action for U.S. Appl. No. 13/760,716 dated May 22, 2013.
Office Action for U.S. Appl. No. 13/760,716 dated Jan. 16, 2014.
Notice of Allowance for U.S. Appl. No. 13/760,716 dated May 1, 2014.
Office Action for U.S. Appl. No. 13/890,908 dated Dec. 30, 2013.
Office Action for U.S. Appl. No. 14/013,703 dated Dec. 10, 2014.
Summons to Attend Oral Proceedings Pursuant to Rule 115(1) EPC dated Feb. 3, 2015.
Oakley, et al.; "Page Description Languages: Development, Implementation and Standardization"; *Electronic Publishing*; vol. 1(2); 79-96; Sep. 1988.
Notice of Allowance issued on Jul. 27, 2015 in connection with U.S. Appl. No. 14/013,703.
United States Patent and Trademark Office, Non-Final Office Action, issued on May 31, 2016 in connection with U.S. Appl. No. 14/923,874.

* cited by examiner

XML PRINTER SYSTEM WITH RFID CAPABILITY

CROSS-REFERENCE TO RELATED APPLICATIONS

This application claims the benefit of priority from and is a continuation of U.S. Ser. No. 13/760,716, filed Feb. 6, 2013, entitled XML Printer System With RFID Capability, which claims the benefit of priority from and is a continuation of U.S. Ser. No. 13/157,973, filed Jun. 10, 2011 entitled XML Printer System With RDID Capability, now U.S. Pat. No. 8,393,540, which claims the benefit of priority from and is a continuation of U.S. Ser. No. 12/551,953, filed Sep. 1, 2009 entitled XML Printer System With RFID Capability, now U.S. Pat. No. 7,988,051, which claims the benefit of priority from and is a continuation of U.S. Ser. No. 10/505,982, filed Mar. 28, 2006 entitled XML Printer System With RFID Capability, now U.S. Pat. No. 7,600,685, which claims the benefit of priority from and is a continuation-in-part of U.S. Ser. No. 10/332,604, filed Oct. 20, 2003 entitled XML Printer System, now U.S. Pat. No. 7,025,268, which claims the benefit of priority from and is a continuation-in-part of U.S. Ser. No. 10/197,014, filed Jul. 17, 2002, entitled Native XML Printer, now U.S. Pat. No. 6,540,142, which claims the benefit of priority from the following provisional applications: 1) provisional patent application U.S. Ser. No. 60/345,389, filed Jan. 4, 2002, entitled XML Printer Technology, and 2) provisional patent application U.S. Ser. No. 60/341,427, filed Dec. 17, 2001, entitled Bar Code Labeling Systems Having Machine Readable Standards. Provisional patent application Ser. Nos. 60/345,389 and 60/341,427 are incorporated herein by reference in their entirety.

STATEMENT REGARDING COPYRIGHT RIGHTS

A portion of this disclosure of this patent document contains material which is subject to copyright protection. The copyright owner has no objection to the facsimile reproduction by anyone of the patent document or the patent disclosure, as it appears in the Patent and Trademark Office Patent files or records, but otherwise reserves all copyright rights whatsoever.

FIELD OF THE INVENTION

The present invention relates generally to a method and apparatus for printing media, such as tickets, tags, cards, barcode labels, sheet fed paper, continuous and fan-folded paper, plastic media, and for encoding RF (Radio Frequency) identification circuitry (RFID) that may be embedded in media, and more specifically in one embodiment, to an XML (Extensible Mark-up Language) printer that prints such printed media and/or encodes RFID devices based on an XML data stream using existing ZPL-based (Zebra Programming Language) format template.

BACKGROUND

Printer systems for printing barcodes and for transmitting data to a barcode printer are known. However, many such systems use proprietary methods of data encoding, and therefore such methods cannot be used interchangeably with other barcode printers. Also; known data encoding methods typically render the underlying data unreadable by humans. While this presents no impediment to the computer systems, it may be burdensome to humans attempting to review, debug or understand certain data appearing in the underlying barcode element names. In that regard, XML is an open standard that is being adopted by many business entities and is human-readable. Use of XML may avoid many of the problems and pitfalls associated with non-human readable methods.

Barcode labeling is used extensively in many facets of commerce. In particular, packages or merchandise shipped from one destination to another are identified by the shipper by a specific barcode label. Conversely, merchandise received may also be identified and entered into the receiver's inventory system by use of the barcode label. Often, the receiver of merchandise may dictate the form and content of the barcode applied by the shipper. This is referred to as "compliance labeling." Of course, merchandise need not be shipped to avail itself of the benefits of barcode labeling. For example, 'inventory control systems make extensive use of barcode labeling to track and monitor various goods within a facility or between facilities.

Compliance labeling is typically used by buyers of merchandise having relatively large market power or purchasing power. Because of their economic power, they may be able to dictate the form and content of the barcode labels applied to products provided to them by their suppliers or vendors. Although this may be burdensome to the supplier, if the supplier desires to do business with the buyer, they must comply with their demands with respect to labeling. For example, large retailers, such as Wal-Mart, Inc., not only have the ability and purchasing power to require that suppliers meet their compliance labeling demands, but may also fine suppliers who fail to comply with the labeling requirements.

Further, such barcode labeling requirements may change at the whim of the entity demanding compliance. Accordingly, the supplier must implement the new labeling requirements and test the modified barcode to insure that it meets all specifications. This is relatively inefficient and time consuming. It is also prone to errors, which may translate into monetary fines.

Radio Frequency Identification (RFID) is increasing being used in addition to or in place of barcode labeling, to identify products as they move through the supply chain and on to consumers. Compliance labeling is being extended to include the application and encoding of RPM tags to pallets of goods, cartons, and individual products. Data about the products can be written to the tags and/or read from the tags. Data such as a product identification number can be stored on the tag, while data such as a unique tag identification number (which serializes the tag and associated product) can be retrieved from the tag.

A need exists to provide an open standard for defining barcode labeling information that is self-validating and which does not require significant software programming changes to implement a change in form or content of a barcode label. A need also exists for use of a format in which to provide data to a barcode printer where the data is understandable by a human reading the data.

A further need exists to permit an enterprise resource planning system (ERP) to format its data for transmission to a barcode printer system in XML, while additionally making use of existing ZPL format templates that govern the layout of the label and/or by making use of a pure XML format template that uses XSL (extensible stylesheet language) to govern the layout of the label to be printed. Additionally, a need exists for use of a format in which other data, such as RFID data, may be supplied to a device to effect encoding of the RFID data into embedded RFID circuits or other automatic identification devices. A need exists to return RFID data read from an RFID circuit to an ERP system or other host computer system.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

DETAILED DESCRIPTION

In this written description, the use of the disjunctive is intended to include the conjunctive. The use of definite or indefinite articles is not intended to indicate cardinality. In particular, a reference to "the" object or thing or "an" object or "a" thing is intended to also describe a plurality of such objects or things.

Figure 1:
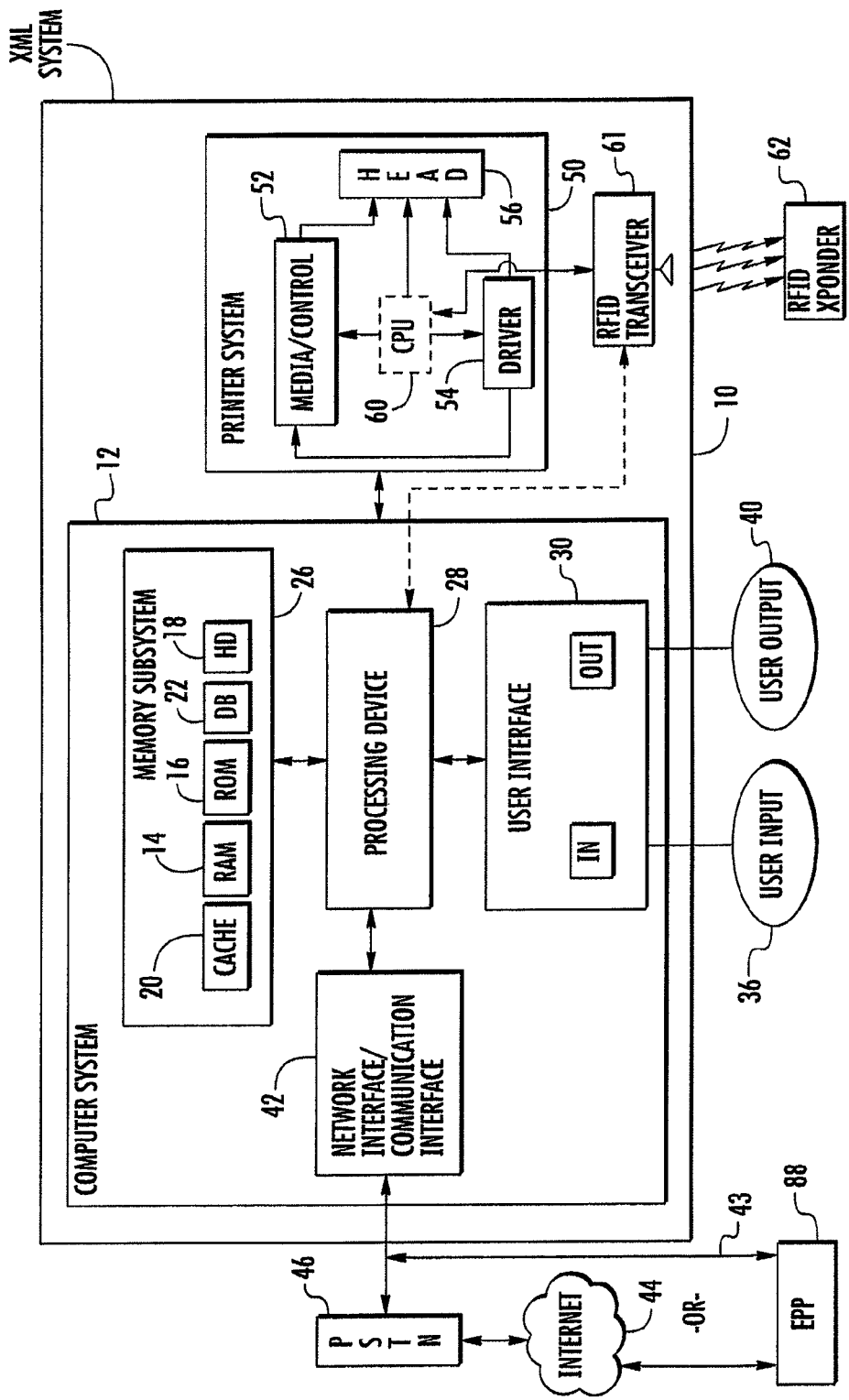
FIG. 1 is a high-level hardware block diagram of a specific embodiment of an XML system according to the present invention.

Referring now to FIG. 1, a specific embodiment of a high-level hardware block diagram of an XML system 10 is shown generally. In the embodiment of FIGS. 1-6, the native or natural "language" of the system is XML, thus the XML system 10 may be referred to as a "native XML printer." The XML system 10 includes a computer or processing system 12, which includes various hardware components, such as RAM 14, ROM 16, hard disk storage 18, cache memory 20, database storage 22, and the like (also referred to as "memory subsystem" 26), as is known in the art. The computer system 12 may include any suitable processing device 28, such as a computer, microprocessor, RISC processor (reduced instruction set computer), CISC processor (complex instruction set computer), mainframe computer, work station, single-chip computer, distributed processor, server, controller, micro-controller, discrete logic computer and the like, as is known in the art. For example, the processing device 28 may be an Intel Pentium® microprocessor, x86 compatible microprocessor, or equivalent device.

The memory subsystem 26 may include any suitable storage components, such as RAM, EPROM (electrically programmable ROM), flash memory, dynamic memory, static memory, FIFO (first-in first-out) memory, LIFO (last-in first-out) memory, circular memory, semiconductor memory, bubble memory, buffer memory, disk memory, optical memory, cache memory, and the like. Any suitable form of memory may be used whether fixed storage on a magnetic medium, storage in a semiconductor device or remote storage accessible through a communication link.

A user interface 30 may be coupled to the computer system 12 and may include various input devices 36, such as switches selectable by the user and/or a keyboard. The user interface also may include suitable output devices 40, such as an LCD display, a CRT, various LED indicators and/or a speech output device, as is known in the art.

To communicate between the computer system 12 and external sources, a communication interface 42 may be operatively coupled to the computer system. The communication interface 42 may be, for example, a local area network, as an Ethernet network, intranet, or other suitable network 43. The communication interface 42 may also be connected to a public switched telephone network (PSTN) 46 or POTS (plain old telephone system), which may facilitate communication via the Internet 44. Dedicated and remote networks may also be employed. Any suitable commercially available communication device or network may be used, as is known in the art.

The computer system 12 may be further coupled to a printer system 50. The printer system 50 may include a media/paper control system 52, a printer driver 54 and a print head mechanism 56. Any suitable printer capable of printing barcode labels may be used, which may include various dot matrix, ink jet, laser and/or thermal printers. Of course, dot matrix printers are usually of lower quality and require closer monitoring of the label output. Preferably, the printer system 50 is a thermal transfer printer. Such suitable printers, for example, are available from Zebra Technologies Corporation of Vernon Hills, Ill., and may include the Model Xi series barcode printers (MIR+, 90XiII1+, 96X1111+, 110XiI E+ 140Xi11I+, 170XiFi1+, 220XiII1+, etc.), the 2800 Series barcode printers, Model Z4M, Z6M, 105SL barcode printers, Model R4 Mplus, R402, R-140 printer/encoders, and others. Any suitable barcode label printer may be used.

Alternatively, the printer system 50 may include a "non-printing" mechanism to handle the programming of RFID (radio frequency identification) media, which may also receive printed labeling or other printed indicia on its surface. The term "printer system" is meant to include systems that also include RFID capability although the "RFID" may not be part of the term. Additionally, although the term "barcode labels" are used herein, this term is not limited to a paper label, and may include, for example, tickets, tags, cards, sheet fed paper, continuous and fanfold paper, plastic media, media embedded with RFID circuits, and other automatic identification devices. The present invention applies to any type of media.

Typically, such printers may include various motors, label cutters, ribbon handlers, sensors, and the like (not shown). Additionally, such printers may include various control inputs or sensors, such as a media sensor, print head temperature sensor, head open sensor, ribbon sensor, and the like (not shown), as is known in the art. The printer system 50 may include one or more additional processors 60, other than the processor 28 residing in the computer system 12. Alternatively, the processor 28 in the computer system 12, if sufficiently powerful, may control and handle the printer system 50 functions without the need for a separate processing device. Thus, all functions of the printer system 50 may be controlled by a computer or processor physically separate from the printer system. Greater detail concerning the control of the print-head may be found in U.S. Pat. No. 5,372,439 entitled "Thermal Transfer Printer With Controlled Ribbon Feed," issued Dec. 13, 1994, and owned by the owner of the present invention. U.S. Pat. No. 5,372,439 is hereby incorporated by reference in its entirety.

The processor 60 of the printer system may be further operatively coupled to an RFID transceiver 61. The RFID transceiver 61 may be operatively coupled to the processor 60 or may be operatively coupled to the processing device 28 of the computer system 12, as shown by a dashed line in FIG. 1. It is not important to the scope of this invention where the RFID transceiver 61 resides or to which processing component it is coupled.

The RFID transceiver 61 is configured to communicate with an RFID transponder 62 and program the RFID transponder. RFID transponder 62 may be of the "chip" or "chipless" type, and one common form of such an RFID transponder, which is often used in "smart labels," includes an antenna and an RFID integrated circuit (not shown). Such RFID transponders 62 include both DC powered active transponders and battery-less passive transponders, and are available in a variety of form factors. The term "barcode printer" or "barcode system" is used interchangeably herein with the term "barcode/RFID system," "XML system" and the like, and such a system includes the capability to encode RFID data into an RFID transponder, even though the term "RF1D" may not necessarily be part of the identifying text. The system 12 must have the capability to encode RFID data into an RFID transponder.

Greater detail concerning RFID transponders may be found in application Ser. No. 10/001,364, entitled Method And Apparatus For Associating On Demand Certain Selected Media And Value-Adding Elements, filed Oct. 25, 2001, and currently pending, which is owned by the assignee of this application. application Ser. No. 10/001,364 is hereby incorporated by reference in its entirety.

Figure 2:
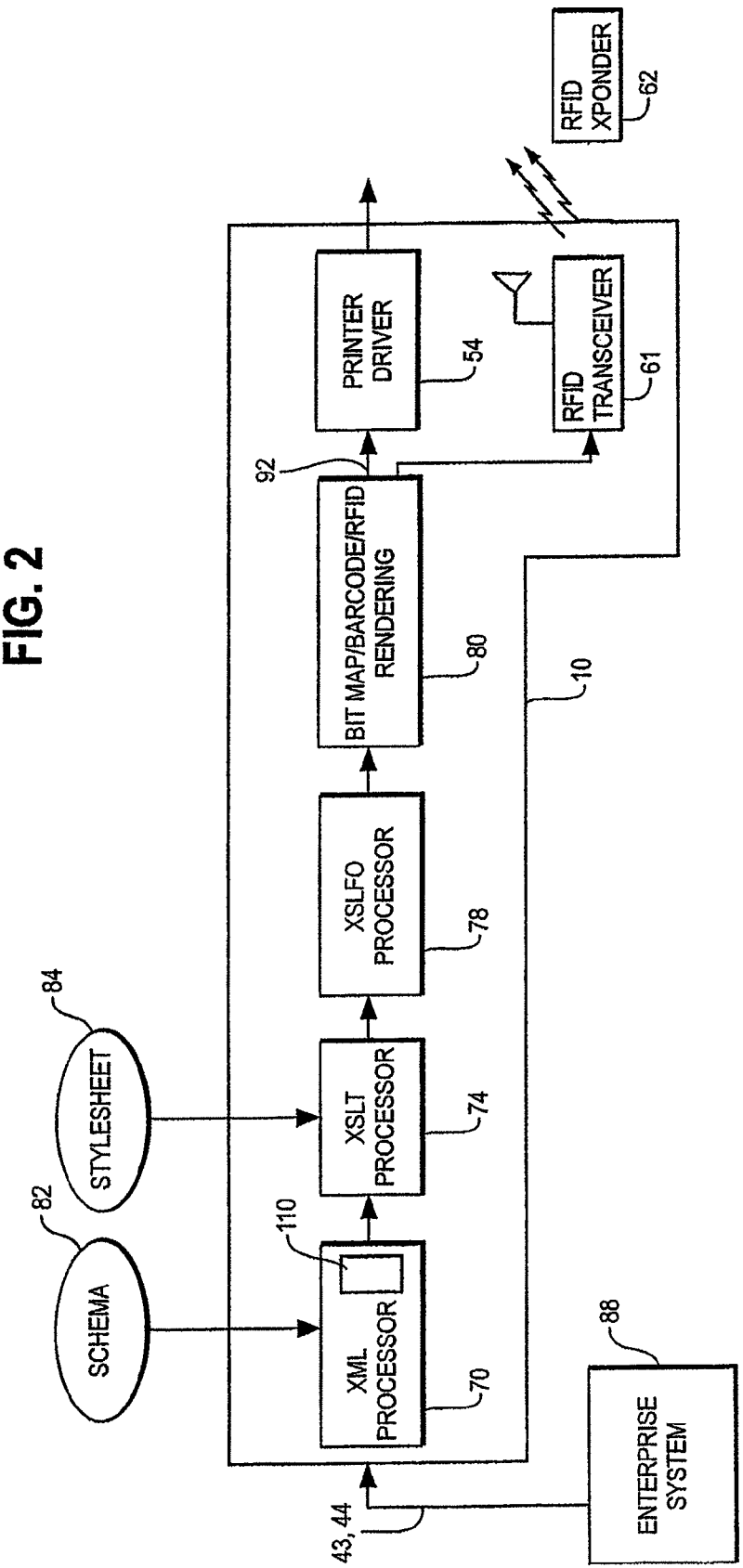
FIG. 2 is a high-level software block diagram of a specific embodiment of an XML system.
Figure 3:
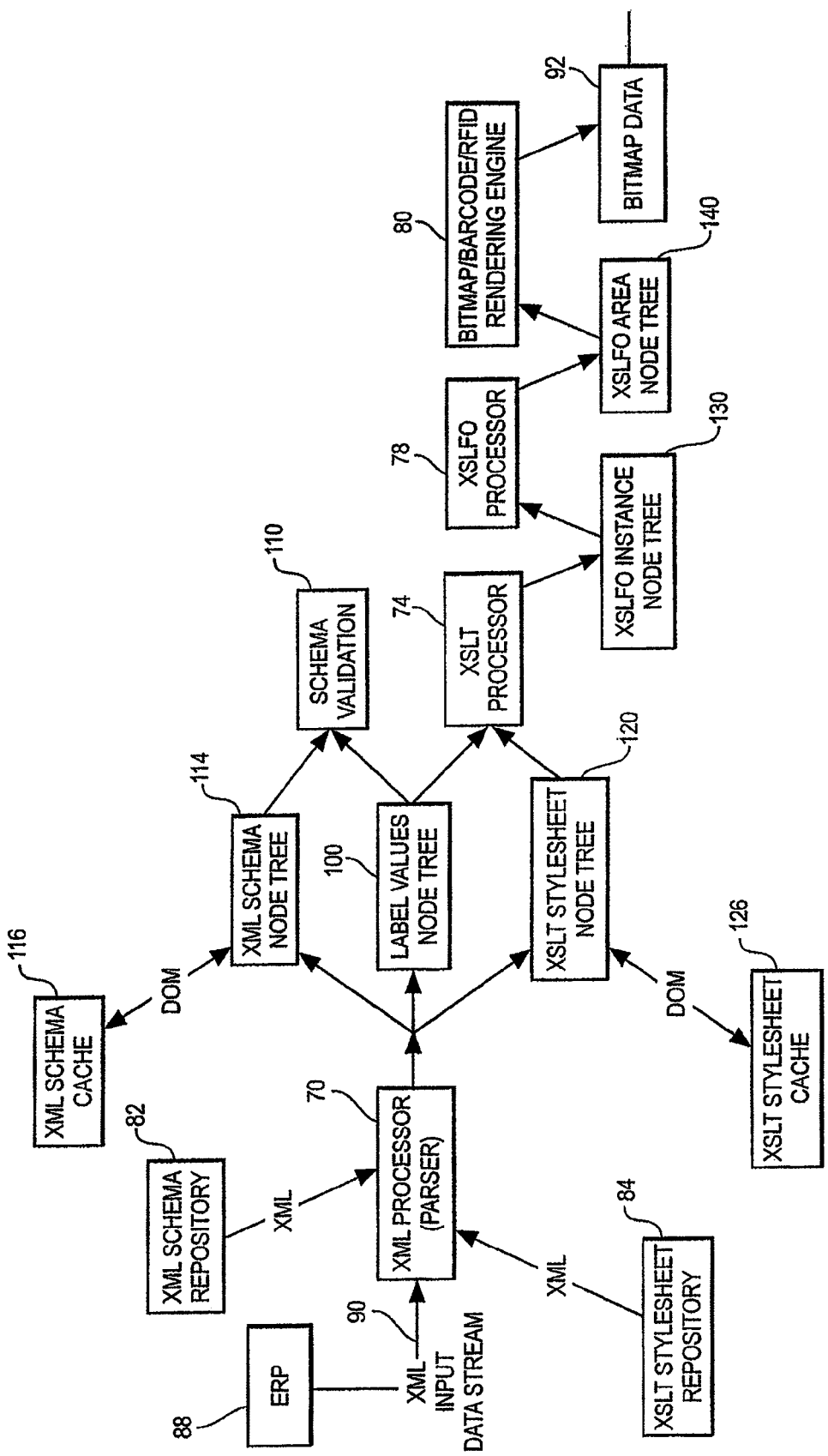
FIG. 3 is a combined high-level software block diagram and data flow diagram of a specific embodiment of an XML system.

Preferably, the computer system 12 and the printer system 50 are located in a common enclosure, but need not necessarily be constructed in this manner. For example, the computer system 12 may be housed in an enclosure separate and apart from the printer system 50. Referring now to FIGS. 1-3, FIG. 2 illustrates a specific embodiment of a high-level software block diagram, while FIG. 3 illustrates a specific embodiment of a combined high-level software block diagram and data flow diagram. The software described below may be executed by the processor 28 of the computer system 12 of FIG. 1. Again, the processor 28 may perform functions common to both the computer system 12 and the printer system 50. There may be one or more processors, which may function in concert or which may function separately. It is not material to the scope of this invention whether the processing or processing functions are performed by or in the computer system or by or in the printer system.

The software blocks illustrated in FIGS. 2-3 include an XML (extensible mark-up language) processor 70 (also referred to as the "XML parser"), an XSLT (extensible stylesheet language transformation) processor 74, an XSLFO (extensible stylesheet language formatting object) processor 78, a bit map/bar code/RFID rendering engine 80, the RBI) transceiver 61 and the printer driver 54 (FIG. 1). Of course, the RFLD transceiver 61 may be used in conjunction with printed labels, or may be used separately. The function and basic structure of the XML system 10 is unaffected by the inclusion or non-inclusion of the RFID transceiver.

Note that the printer driver 54 is an example of a component described above whose function may be performed by either the processing device in the computer system 12 or the processing device 60 (FIG. 1) in the printer system 50, depending upon the physical location of the associated processing device. Again, a single processing device, if sufficiently powerful, may handle all functions for the XML system 10.

An XML schema repository 82 (schema repository) may provide input to the XML processor 70 while an XSLT stylesheet repository 84 (stylesheet repository) may provide input to the XSLT processor 74. Also shown is an enterprise resource planning (ERP) system 88, which may be, for example, a warehouse management system that transmits an XML input data stream 90 to the XML processor 70. The ERP system 88 essentially initiates the request to print the barcode label, or encode the RFTD data into the RFD) transponder 62 and provides the XML data that forms the bar code, RF encoded data, and other variable label or element fields to be printed or encoded. Such variable label fields may include, for example, any or all of the human-readable text and/or characters printed on the label. Of course, any enterprise computer system may be used, and this invention is not limited to use with any specific type of enterprise computer system.

When referring to the XML data, two basic types shall be referred to herein, namely, the XML value data and the XML element name. The XML value data is the changeable data or the data that is desired to be printed on the barcode label or encoded into the RFID transponder, such as the data "1122 Green Street," which may be part of the XML value data corresponding to, for example, a shipping address. The XML element names are part of the XML language semantics where an arbitrary label or element name may be selected to represent the XML value data, the use of which is defined by the XML language. Typically, the element names appear between angled bracket ("<element name>").

As described above, known barcode label and other automatic identification systems often use proprietary software encoding schemes. Additionally, such schemes are often prone to errors, and the underlying value data is usually unreadable by a non-technical individual. In known systems, if an error exists in the underlying value data sent from the enterprise system, or if the data is missing or otherwise incorrect, the barcode system will print or encode what it is instructed to do, which of course, produces an error in the barcode label or RFID transponder, rendering it inaccurate or useless.

Moreover, when dealing with compliance labeling, known systems require non-trivial changes in the data encoding when the form or content of the label changes in accordance with the compliance label demands. Such changes in the form or content of the barcode or RFID transponder, again, are susceptible to errors, which in turn can lead to monetary fines by the entity demanding compliance. Business relationships may also be damaged by continued problems in the barcode labeling system, especially if such errors disrupt the business of the compliance demander.

The present XML system 10 utilizes an open format. In particular, the formatting requirements and the form of the barcode label or RIM transponder are all defined in the XML language. Moreover, not only is XML well defined and available for all to use, but non-programmers can understand the data and commands in an XML data stream or file (or hard copy) with minimal training.

Various XML software blocks shown in FIGS. 2-3 are commercially available. Several different commercially available XML processors 70 may be used interchangeably or with little modification. For example, the following commercially available XML processors 70 may be used: "XML for C++" available from IBM Corporation, "MSXML3" available from Microsoft Corporation, "Oracle .XML Developers Kit for C" available from Oracle Corporation, "Expat" available from That Open Source Software Center, Ltd., or "XercesC++" available from the Apache Software Foundation. However, any suitable XML processor may be used.

Similarly, several different commercially available XSLT processors 74 may be used interchangeably or with little modification. For example, the following XSLT processors 74 may be used: "iXSLT" available from Infoteria Corporation, "MSXML3" Available from Microsoft Corporation, and "Libxslt" available from Gnome. However, any suitable XSLT processor may be used.

Again, several different commercially available XSLFO processors 78 may be used interchangeably or with little modification. For example, the following XSLFO processors 78 may be used: "XEP" available from RenderX Corporation, "XSL Formatter" available from Antenna House Corporation, and "FOP" available from the Apache Software Foundation. However, any suitable XSLFO processor may be used.

Still referring to FIGS. 1-3, the XML processor 70 receives the XML input data stream 90 from an external source 88. For example, the external source may be the ERP system 88, such as the warehouse management system. The XML processor 70 essentially parses and processes the XML input data stream 90 and generates a set of nodes, which may be in a "tree" structure, as is known in the art. Each of the software processing blocks shown in FIGS. 2-3 act on the nodes of the "tree" to perform their required function. The underlying value data contained in the XML input data stream 90 from the ERP system 88 is processed and entered into a "label values node tree," 100 which holds the data.

The following is a brief overview of the operation of the various software components. First, note that the XML input data stream 90 includes text that identifies the name and location of other required X1vIL documents or files. One such document is referred to as "XML schema" or "schema." The schema is used to validate the XML input data stream, including the underlying value data. If validation is successful, a stylesheet is applied, as will be described below. The name and location of the stylesheet is also specified in the XML input data stream 90. Application of the stylesheet is handled by the XSLT processor 74, which under the direction of the stylesheet, may transform the underlying XML element names and/or underlying value data. Next, the data is processed by the XSLFO processor 78, which handles formatting and "layout" of the underlying value data, which may include, for example, formatting the underlying value data in accordance with, for example, font type, font size, color, and the like. Next, the underlying value data is processed by the bitmap/barcode/RFID rendering engine 80, which creates a bitmap 92 of the barcode label or the programming code sequence for the RFD transponder corresponding to the transformed and formatted data. The rendering engine 80 may utilize an "instream foreign object" residing in the stylesheet to direct creation of the bitmap. The bitmap 92 is then sent to the printer driver 54 (FIG. 1) for subsequent printing of the barcode label by the barcode printer or to the RFID transceiver 61 for encoding into the RFID transponder 62 (FIG. 1).

As described above, the schema functions to validate the entire input data stream 90, in particular, the underlying value data, where errors may be typically found. In practice, errors are often inadvertently introduced when changes are made to the form or content of the bar code label.

The name and location of the schema document is contained in the XML input data stream 90, which XML input data stream corresponds to the request to print and/or encode a barcode label. The XML processor 70 in conjunction with a schema validation module 110 validates the underlying value data. The use of schema is cost effective because it prevents errors and omissions with respect to the final output, namely, the bar code label, "shipping label," or RFID tag transponder.

If the XML input data stream 90 is rejected or flagged as having an error, an error message may be transmitted back to the source 88. This may flag or trigger human intervention to correct the error. For example, in this specific example, the source is the ERP system 88. In this way, the data is initially checked prior to processing to insure that it complies with all required label and barcode rules.

This may be particularly beneficial when dealing with compliance labeling. In known systems, the compliance demander would merely notify the supplier as to the changes in the compliance labeling requirements. If the supplier then makes an error in interpreting or implementing these changes or instructions, the labels produced or RFID transponders encoded and applied to products shipped to the compliance demander may have errors, which could jeopardize future business or cause monetary fines to be applied.

In the present invention, the compliance demander preferably makes the changes directly to the schema and/or the XSLT stylesheet. For example, if the physical layout of the label has been changed or if element names have been changed, the compliance demander will modify the XSLT style sheet. Similarly, if the underlying value data has been added or deleted or otherwise qualified (e.g., a new acceptable numerical range for a zip code), the compliance demander may modify the schema. In this way, the supplier need only modify the output of its ERP system 88 to ensure that it matches the modified XML input data stream 90. If only the physical layout of the label has changed, the supplier does not need to make any modifications at all.

For example, the compliance demander may now require that a nine digit zip code be used rather than the original five digit zip code. Accordingly, the compliance demander may modify the schema to require both a first and second zip code field, and the second field will also be limited to numerical digits within a certain range, perhaps 0000-9999. The compliance demander may also modify the stylesheet to accommodate that change. In response thereto, the supplier must insert the added zip code field in its ERP system so that it appears in the XML input data stream 90 sent to the XML system 10. If such modification of the XML input data stream 90 is not performed correctly, the schema will cause an error to be reported back to the ERP system 88, and the label will not be printed or the RFID transponder will not be encoded.

Thus, the supplier need only access the modified schema and/or stylesheet from the repository 82, 84, which is automatically applied to the underlying value data when received. Essentially, minor changes, and significantly, major changes, to the form and content of the barcode label or RFID transponder are transparent to the supplier, and such changes to the content of the barcode label or RFID transponder are validated in accordance with the schema. Accordingly, the supplier need not incur costs to change the form or content of the barcode label or RFID transponder dictated by the compliance demander, and cannot make any errors in implementing such changes. If there are any errors, such errors would have been inadvertently made by the compliance demander, who could not then blame the supplier.

The schema documents are preferably obtained from the XML schema repository 82. In one specific embodiment, the schema repository 82 may be external to the XML system 10 and the computer system 12, and may be accessed via the network, the Internet, or via any suitable network 43, 44 to which the computer system is coupled. The schema repository 82 may contain a plurality of schema documents. Thus, the XML input data streams 90 representing the various requests to create a barcode label or RFID transponder may each specify the name and location of the corresponding schema in the repository 82. When the request is received by the XML processor 70, the corresponding schema may be retrieved from the schema repository 82.

In another embodiment, the schema obtained from the schema repository 82 via the network 42, 43 may be kept locally, and thus may temporarily reside in the memory subsystem 26 (FIG. 1), such as the hard disk 18 or database 22. In this way, if the same schema is used for multiple XML input data streams 90 or for subsequent barcode label requests, the XML processor 70 need not retrieve the same schema externally via the network 42, 44, but rather, may retrieve that schema from the memory subsystem 26, which may be more efficient. According to this embodiment, the compliance demander may change or modify the schema in the external repository 82 at only certain times. For example, the compliance demander may change the stylesheet only at 1:00 AM each day. Thus, the supplier need only update the schema from the repository 82 into the memory subsystem 26 only once per day, for example, after the compliance demander has performed the schema update. The supplier would then know that the schema saved temporarily in the memory subsystem 26 is the most recent schema document, at least up until the time that the updating is scheduled to occur.

Regardless of the location from where the schema is obtained, the schema validation module 110 performs the checking and validation of the underlying data. Although the schema validation module 110 is shown as a separate block from the XML processor 70 in FIG. 2, it is shown in this location for purposes of illustration only so that it may be shown on the drawing adjacent to the label values node tree 100, which is the data upon which it acts. However, the schema validation module 110 may be part of and integrated into the XML processor 70, or it may be a separate and apart therefrom.

Of course, the schema is also an XML document, and thus it is also processed by the XML processor 70. Accordingly, the result of the processing of the schema is the XML schema node tree 114 shown in FIG. 3, which is the "memory representation" or working model of the schema that was processed. The XML schema node tree 114 may be in the form of a "document object model" (DOM), as is known in the art. Further, the XML schema node tree 114 may reside in cache memory for efficiency, as shown in an XML schema cache 116. The schema validation module 110 and/or the XML processor 70 operate on the data in the XML schema node tree 114 to perform its function of validating the underlying value data in accordance with the schema document.

As described above, if an error exists in the XML input data stream 90, as determined by application of the schema, an error message may be generated. If the XML input data stream 90 is validated, the data remains essentially "untouched." The data in the label value node tree 100 is then processed by the XSLT processor 74 using the XSLT stylesheets.

Alternatively, validation of the underlying value date may be performed according to Document Type Definition (DTD) format, rather than use of schema. Use of DTD is specified in detail in various XML specifications, and is known in the art.

The stylesheet documents are preferably obtained from the XSLT stylesheet repository 84. In one specific embodiment, the stylesheet repository 84 may be external to the XML system 10 and the computer system 12, and may be accessed via the network, the Internet, or via any suitable network 43, 44 to which the computer system is coupled. The stylesheet repository 84 may contain a plurality of stylesheets. Thus, WI., input data streams 90 representing the various requests to create a barcode label or encode an RFID transponder may each specify the name and location of the corresponding stylesheet in the repository 84. When the request is received by the XML processor 70, the corresponding stylesheet may be retrieved from the stylesheet repository 84.

In another embodiment, the stylesheet obtained from the stylesheet repository 84 via the network 43, 44 may be kept locally, and thus may temporarily reside in the memory subsystem 26 (FIG. 1), such as the hard disk 18 or database 22. In this way, if the same stylesheet is used for multiple XML input data streams 90 or for subsequent barcode label or RFID transponder requests, the XML processor 70 need not retrieve the same stylesheet externally via the network 43, 44, but rather, may retrieve that stylesheet from the memory subsystem 26, which may be more efficient.

According to this embodiment, the compliance demander may change or modify the stylesheet in the external stylesheet repository 84 at only certain times. For example, the compliance demander may change the stylesheet only at 1:00 AM each day. Thus, the supplier need only update the stylesheet from the stylesheet repository 84 into the memory subsystem 26 only once per day, for example, after the compliance demander has performed the stylesheet update. The supplier would then know that the stylesheet saved temporarily in the memory subsystem 26 is the most recent stylesheet, at least up until the time that the updating is scheduled to occur.

Of course, the stylesheet is also an XML document, and thus it is also processed by the XML processor 70. Accordingly, the result of the processing of the stylesheet is the XSLT stylesheet node tree 120 shown in FIG. 3, which is the "memory representation" or working model of the stylesheet that was processed. The XSLT stylesheet node tree 120 may be in the form of a "document object model" (DOM), as is known in the art. Further, the XSLT stylesheet node tree 120 may reside in cache memory for efficiency, as shown in an XSLT stylesheet cache 126. The XSLT processor 74 operates on the data in the XSLT stylesheet node tree 120 to perform its function of transforming the underlying value data or underlying element names in accordance with the stylesheet.

Note that although the XSLT style sheet is shown as an input to the XML processor 70 in FIG. 3, the XSLT processor 74 processes the stylesheet. It is initially provided to the XML processor 70 because all XML documents are first processed and placed into the appropriate data structure for subsequent processing.

The XSLT processor 74 may modify, reposition, and rearrange the underlying value data or may add to the underlying value data or delete some of the underlying value data. For example, under direction of the stylesheet, the underlying value data may be rearranged into table format or into columns. In particular, the stylesheet may add XSLFO formatting elements and attributes.

After the underlying value data in the label value node tree 100 has been processed in accordance with the corresponding stylesheet, an XSLFO instance node tree 130 is produced.

Again, the XSLFO instance node tree 130 may be in the form of a document object module, as is known in the art. The XSLFO instance node tree 130 contains XSLFO commands (layout instructions) that directs the XSLFO processor 78 with respect to formatting and layout. The XSLFO processor 78 then interprets the XSLFO commands and applies such commands to the underlying value data so as to properly format and layout the underlying value data. The XSLFO processor 78 produces the XSLFO area node tree 130, which represents the final output of formatting before rendering.

Turning now to FIG. 3 and a code segment shown immediately below • entitled "code segment 1 for an XML input data stream," the code segment 1 illustrates an XML input data stream 90 in hard copy, which may, for example, be sent to the XML system 10 by the ERP or warehouse management system 88. Line numbering has been inserted for purposes of illustration only and is not part of the code.

Code Segment 1 For An XML Input Data Steam

```
1  <?xml version="1.0" encoding="UTF-8"?>
    <?xml-stylesheet type="text/xsl"
        href="D:\Projects\XML\Native\Docs\ShipLabels.xsl"?>
    <labels
5   xmlns:xsi="http://www.w3.org/2001/XMLSchema-instance"
        xsi:noNamespaceSchemaLocation=
            "D:\Projects\XML\Native\Docs\ShipLabels.xsd">
        <label>
            <name>Albert Einstein</name>
10          <address>1234 Relative Way</address>
            <city>Princeton</city>
            cstate>NJ</state>
            <zip>08540</zip>
        </label>
15      <label>
            <name>Steven Hawking</name>
            <address>5678 Black Hole Drive</address>
            <city>Los Angeles</city>
            <state>CA</state>
20          <zip>90007</zip>
        </label>
        <label>
            <name>Richard Feynman</name>
            <address>90 Quantum Circle</address>
25          <city>New York</city>
            <state>NY</state>
            <zip>10044</zip>
        </label>
    </labels>
```

The XML input data stream identifies the schema document as "ShipLabels.xsd," and that schema document may be found, in this specific example, in a directory called "D:/Projects/XIVIUNative/Docs," as shown at line 7 in code segment 1. Further, the XML input data stream identifies the stylesheet document as "ShipLabels.xsl," and that stylesheet document may also be found in a directory called "D:/Projects/XM1JNative/Docs," as shown at line 3 of the code segment 1. Of course, the schema document and the stylesheet document may be located anywhere, for example, as identified by an Internet address.

This specific example shows the underlying value data and element names for three shipping labels to be printed. Each shipping label contains an XML element name defined between angular brackets as follows: <name>, <address>, <city>, <state> and <zip>. The value of the first element name, <name>, is "Albert Einstein," the value of the second element name, <address>, is "1234 Relative Way," the value of the third element name, <city>, is "Princeton," the value of the forth element name, <state>, is "NJ" and the value of the fifth element name, <zip>, is "08540." This is the underlying value data.

Now turning to FIG. 3, code segment 1, and a code segment shown immediately below entitled "code segment 2 for XIv1L schema," the code segment 2 illustrates a specific example of an XML document in the form of the XML schema document specified in the XML input data stream of code segment 1. Line numbering has been inserted for purposes of illustration only and is not part of the code.

Code Segment 2 For XML Schema

```
1  <?xml version="1.0" encoding="UTF-8"?>
    <xs:schema
        xmlns:xs="http://www.w3.org/2001/XMLSchema"
        elementFormDefault="qualified">
5   <xs:element name="address" type="xs:string"/>
    <xs:element name="city" type="xs:string"/>
    <xs:element name="laber>
        <xs:complexType>
            <xs:sequence>
10              <xs:element ref="name"/>
                <xs:element ref="address"/>
                <xs:element ref="city"/>
                <xs:element ref="state"/>
                <xs:element ref="zip"/>
15          </xs:sequence>
        </xs:complexType>
    </xs:element>
    <xs:element name="labels">
        <xs:complexType>
20          <xs:sequence>
                <xs:element ref="label" maxOccurs="unbounded"/>
            </xs:sequence>
        </xs:complexType>
    </xs:element>
25  <xs:element name="name" type="xs:string"/>
    <xs:element name="state">
        <xs:simpleType>
            <xs:restriction base="xs:string">
                <xs:enumeration value="CA"I>
30              <xs:enumeration value="NJ"/>
                <xs:enumeration value="NY"/>
            </xs:restriction>
        </xs:simpleType>
    </xs:element>
35  <xs:element name="zip">
        <xs:simpleType>
            <xs:restriction base="xs:intli>
                <xs:minInclusive value="00000"/>
                <xs:maxInclusive value="99999"/>
40          </xs:restriction>
        </xs:simpleType>
    </xs:element>
</xs:schema>
```

As mentioned above, the schema is used to validate the underlying value data. This entails checking to determine that all required data is present, that no extraneous data is present, that the data present is within the specified ranges, and the like. Any suitable validation scheme may be specified in the schema, depending upon the application. The XML language is robust and code may be written to handle a vast multitude of requirements.

For example, the schema document shown in code segment 2 above specifies that the underlying value data corresponding to the element name, <address>, must be a string, as defined in the XML Schema specification, as shown by line 5 in the code segment 2. The schema document also specifies that the underlying value data corresponding to the element names of <name>, <address>, <city>, <state>, and <zip> must also be present in the sequence indicated, as shown by lines 9-15 in the code segment 2. Further, this specific schema document shown. in the code segment 2 specifies that the underlying value data corresponding to the element name, <state>, must be one of three states, namely, "CA," "NJ," or "NY." Of course, this is only an abbreviated example, and not all states have been included for purposes of illustration only. The schema document shown in code segment 2 also specifies that the underlying value data corresponding to the element name, <zip>, must be in the range from 00000 to 99999. If any of the above-mentioned schema criteria are not met by the data in the XML input data stream, the schema validation module 110 will reject it, and will preferably return an error message back to the source 88.

Now turning to FIG. 3, code segments 1-2, and a code segment shown immediately below entitled "code segment 3 for an XSLT stylesheet," the code segment 3 shows a specific example of an XML document in the form of the XSLT stylesheet document specified in the XML input data stream of the code segment 1. Line numbering has been inserted for purposes of illustration only and is not part of the code.

---

Code Segment 3 For An XSLT Stylesheet

```
1  <?xml version="1.0" encoding="UTF-8" ?>
    <xsl:transform version="1.0"
        xmlns:xsl=nhttp://www.w3.org/1999/XSL/Transformn
        xmlns:fo=nhttp://www.w3.org/1999/XSL/Format"
5   xmlns:bo="http://www.zebra.com/2002/XSL/Barcoden>
    <xsl:output method="xml" version="1.0" indent="yes" />
        <xsl:template match="labels">
            <fo:root>
                <fo:layout-master-set>
10                  <fo:simple-page-master master-name="all-labels">
                        <fo:region-body margin="1in" I>
                    </fo:simple-page-master>
                </fo:layout-master-set>
                <fo:page-sequence master-name="all-labels">
15                  <fo:flow flow-name="xsl-region-body" font="12pt
                        Times">
                        <xsl:apply-templates />
                    </fo:flow>
                </fo:page-sequence>
            </fo:root>
20      </xsl:template>
        <xsl:template match="label">
            <fo:block break-after="page">
                <xsl:apply-templates select="name" I>
                <xsl:apply-templates select="address" />
25              <fo:block font="bold 14pt Times" text-align="left">
                    <xsl:apply-templates select="city" I>
                    <xsl:apply-templates select="state" I>
                </fo:block>
                <xsl:apply-templates select="zip" I>
30              <fo:block>
                    <fo:instream-foreign-object>
                        <bo:barcode>
                            <bo:postnet interpretation-line="none">
                                <xsl:value-of select="zip" />
35                          </bo:postnet>
                        </bo:barcode>
                    </fo:instream-foreign-object>
                </fo:block>
            </fo:block>
40      </xsl:template>
        <xsl:template match="name">
            <fo:block font="bold 14pt Times" text-align="left">
                <xsl:value-of select="." />
            </fo:block>
45      </xsl:template>
        <xsl:template match="address">
            <fo:block font="bold 14pt Times" text-align="left">
                <xsl:value-of select="." />
            </fo:block>
50      </xsl:template>
        <xsl:template match="city">
            <xsl:value-of select="." I>
        </xsl:template>
        <xsl:template match="statell>
55          <xs1:text>,</xs1:text>
            <xsl:value-of select="." />
        </xsl:template>
        <xsl:template match="zipn>
            <fo:block font="bold 14pt Times" text-align="left">
60              <xsl:value-of select="." I>
            </fo:block>
        </xsl:template>
    </xsl:transform>
```

---

As mentioned above, the stylesheet is used to transform the data. In this specific example, the stylesheet of the code segment 3 defines two types of namespace, namely, a "bo" type object, which is selected to be a "barcode-type object," and an "fo" type object, which is selected to be a formatting object, which was described above with respect to the XSLFO processor 78. This permits differentiation between the different objects, as is known in the art. The stylesheet may cause some data to be transformed or even added. For example, the underlying value data from the XML input data stream of the code segment 1, namely "Einstein, "1234 Relative Way," and the like, is inserted, as indicated by lines 40-62.

This stylesheet also causes a variety of "fo" type elements to be generated, which are designated as formatting elements or XSLFO objects. The XSLFO objects contain layout type commands that the XSLFO processor 78 "understands" and processes. Note that all lines of code having a prefix of "fo" are not interpreted by the XSLT processor 74, but rather, are passed on to the XSLFO processor 78.

For example, line 21 of the code segment 3 shows <xsl:template match="label"> followed by <fo:block break-after ="page"> on line 22. This is interpreted by the XSLFO processor 78 to put a "page break" between the three shipping labels specified in the code segment 1. Essentially a new shipping label is created due to the page break, with each new shipping label containing the underlying value data specified in the code segment 1.

Further, this specific stylesheet specifies that an "instream foreign object" is inserted, as shown at line 31. Line 31 is shown as <fo:instream-foreign-object> in conjunction with lines 31-37, which define the instream foreign object. Note that the instream foreign object is not processed by either the XSLT processor 74 or the XSLFO processor 78. Rather, the instream foreign object is passed to and is processed by the bitmap/barcode/RFID rendering engine 80. For example, lines 32-36 of the code segment 3 cause a <bo:barcode> element to be inserted that contains the definition of a "postnet" barcode element, which element will later be processed by the bitmap/barcode/RFID rendering engine 80. At line 34, the XSLT processor 74 causes the zip code from the XML input data stream to be inserted as the text of the <bo:postnet> element. Alternatively, although not shown in the code, an RFID type instream foreign object may define the encoding for programming an RFID transponder.

Now turning to FIG. 3, code segments 1-3, and a code segment shown immediately below entitled "code segment 4 for an XSLT instance node tree representation," the code segment 4 shows a specific example of a representation of an XSLFO instance node tree 130 output produced by the XSLT processor 74 in conjunction with the stylesheet of code segment 3, which output is a representation of the XSLFO instance node tree provided to the XSLFO processor 78. Line numbering has been inserted for purposes of illustration only and is not part of the code.

---

Code Segment 4 For An XSLFO Instance Node Tree Representation

```
1   <?xml version="1.0" encoding="UTF-16" ?>
    <fo:root xmlns:fo="http://www.w3.org/1999/XSL/Format"
        xmlns:bo="http://www.zebra.com/2002/XSL/Barcode>
        <fo:layout-master-set>
5           <fo:simple-page-master master-name="all-labels">
                <fo:region-body margin="1in" I>
            </fo:simple-page-master>
        </fo:layout-master-set>
        <fo:page-sequence master-name="all-labels">
10          <fo:flow flow-name="xsl-region-body" font="12pt Times">
                <fo:block break-after="page">
                    <fo:block font="bold 14pt Times" text-
                        align="left">Albert Einstein</fo:block>
                    <fo:block font="bold 14pt Times" text-
                        align="left">1234
```

Code Segment 4 For An XSLFO Instance Node Tree Representation

```
              Relative Way</fo:block>
          <fo:block font="bold 14pt Times" text-
            align="left">Princeton, NJ</fo:block>
          <fo:block font="bold 14pt Times" text-
            align="left">08540</fo:block>
          <fo:block>
            <foanstream-foreign-object>
              <bo:barcode>
                <bo:postnet interpretation-
                  line="none">08540</bo:postnet>
              </bo:barcode>
            </fo:instream-foreign-object>
          </fo:block>
        </fo:block>
        <fo:block break-after="page>
          <fo:block font="bold 14pt Times" text-
          align="left">Steven Hawking</fo:block> <fo:block
            font="bold 14pt Times" textalign="left">5678
            Black Hole Drive</fo:block>
          <fo:block font="bold 14pt Times"
            textalign="left">Los
              Angeles, CA</fo:block>
          <fo:block font="bold 14pt Times" text-
            align="left">90007</fo:block>
          fo:block>
            <fo:instream-foreign-object>
              <bo:barcode>
                <bo:postnet interpretation-
                  line="none">90007</bo:postnet>
              </bo:barcode>
            </fo:instream-foreign-object>
          </fo:block>
        </fo:block>
        <fo:block break-after="page">
          <fo:block font="bold 14pt Times" text-
            align="left">Richard Feynman</fo:block>
          <fo:block font="bold 14pt Times" text-
            align="left">90 Quantum Circle</fo:block>
          <fo:block font="bold 14pt Times" text-
            align="left">New York, NY</fo:block>
          <fo:block font="bold 14pt Times" text-
          align="left">10044</fo:block>
          <fo:block>
            <fo:instream-foreign-object>
              <bo:barcode>
                <bo:postnet interpretation-
                  line="none">10044</bo:postnet>
              </bo:barcode>
            </fo:instream-foreign-object>
          </fo:block>
        </fo:block>
      </fo:flow>
    </fo:page-sequence>
</fo:root>
```

Two main portions of code segment 4 above are briefly described, namely, one portion beginning at line 4 with the code <fo:layout-master-set> and a second portion beginning at line 9 with the code <fo:page-sequence master-name="all-labels>. This portion of the code essentially defines what a barcode label will "look like" or how it will be "laid-out" and how the underlying value data will appear in that lay-out.

With respect to formatting the underlying value data shown in code segment 1, for example, the font attribute of "bold 14 pt Times" and text-align="left" shown in lines 12-13 will be applied to the underlying value data of "Albert Einstein" so that when the barcode label is printed, the name of "Albert Einstein" will be printed in 14 point Times font, and it will be aligned with the left margin of the barcode label. As is known in the art, many different kinds of formatting instructions may be specified, which will be interpreted by the XSLFO processor 78.

Further, this specific example of the representation of the XSLFO instance node tree. 130 contains an instream foreign object, as shown at lines 21-26 of the code segment 4, which instream foreign object may not be processed by the XSLFO processor 78. Rather, the insteam foreign object may be passed to the bitmap/barcode/RFID rendering engine 80 for processing. Note that at this point in the processing, the XSLFO processor 78 does not "know" how to print a barcode label or encode an RFID transponder because barcode element types and RFID transponder element types are not included in the XSLFO specification. Rather, only the text information, such as the underlying value data, namely, "Einstein," "1234 Relative Way," and the like, as shown in code segments 1-2, could be printed on the barcode label as text. With respect to labels, no actual barcode symbol would appear because the XSLFO processor 78 does not "know" how to produce a barcode symbol. The RFID transponder would not be encoded because the XSLFO processor 78 does not "know" how to encode a transponder.

The result of processing by the XSLFO processor 78 is an XSLFO area node tree 140. Note that the instream foreign object shown in the code segment 4 is not processed by the XSLFO processor 78, but rather, is passed to the barcode/bitinap/RFID rendering engine 80 in one or more nodes of the XSLFO area node tree 140. The instream foreign object element is referred to as <bo:barcode> and is shown at lines 21-26 of the code segment 4. The barcode/bitmap/RFID rendering engine 80 receives the <bo:barcode> element and processes the code contained in that block. For example, the rendering engine 80 interprets lines 23-24, namely, <bo:postnet interpretation-line="none">08540<bo:postnet> as defining this particular node as being a "postnet" barcode type of element. Many different "types" of barcode symbols may be defined, as is defined by corresponding industry standards, discussed below.

Alternatively, if the instream foreign object element relates to RFID encoding, the rendering engine 80 would interpret the instream foreign object according to specific standards governing the programming and encoding of the RFID transponder 62 (FIG. 2) by the RFID transceiver 61 (FIG. 1). Like the elements and attributes of the XML data that specify how a barcode is to be printed, such elements and attributes can also specify the text and characteristics to be programmed into an RFID tag, such as the RFID transponder 62. Essentially, the rendering in accordance with the RFID-type instream foreign object governs the operation of the RFD transceiver 61 (FIG. 1). As such, radio frequency signals are transmitted between the RFID transceiver and the RFD transponder to effect programming of the RFID transponder.

The operation of the RFID transceiver may be according to international standards such as ISO/IEC or according to proprietary specifications from vendors such as Texas Instruments (Tag-it) or Phillips Code). For example, operation may be governed by the International Organization for Standardization (ISO) specification 15693 for vicinity cards, or by ISO specification 14443 for proximity cards. ISO specification 15693 describes the physical characteristics, the radio frequency power and signal interface, and the anticollision and transmission protocol. The transmission protocol specification includes the requests and responses to read, write, and lock the transponder. Note that the ISO specification 15693 is a preferable applicable standard when RFID label tags are involved.

The underlying value data to be printed as a barcode symbol is the numerical data "08540," as shown in line 24 of code segment 4, which underlying value data is the zip code associated with Albert Einstein's address shown in the code segment 1. In this specific example, only the zip code is transformed into the barcode symbol. Of course, any and all information may be transformed into a barcode symbol, depending upon the application. Also, in this specific example, the instream foreign objects shown in the code segment 4 only relate to the three zip codes shown in the code segment 1. No other underlying value data is transformed into the barcode symbol in this example.

Also note that the XML system 10 need not necessarily contain the XSLT processor 74. In an alternate embodiment, the XSLT processor 74 or the equivalent thereof may be remotely located from the XML system 10 and may be configured to transform XML data in the XML input stream and provide the transformed data to the XML system. Accordingly, the XML system 10 may receive and process the transformed XML data into formatted XML data. Remote or "separate" processing equivalent to the processing typically handled by the XSLT processor may be based upon XSLFO instructions contained in stylesheets, which also need not reside in or be directly accessible to the XML system 10.

Figure 4:
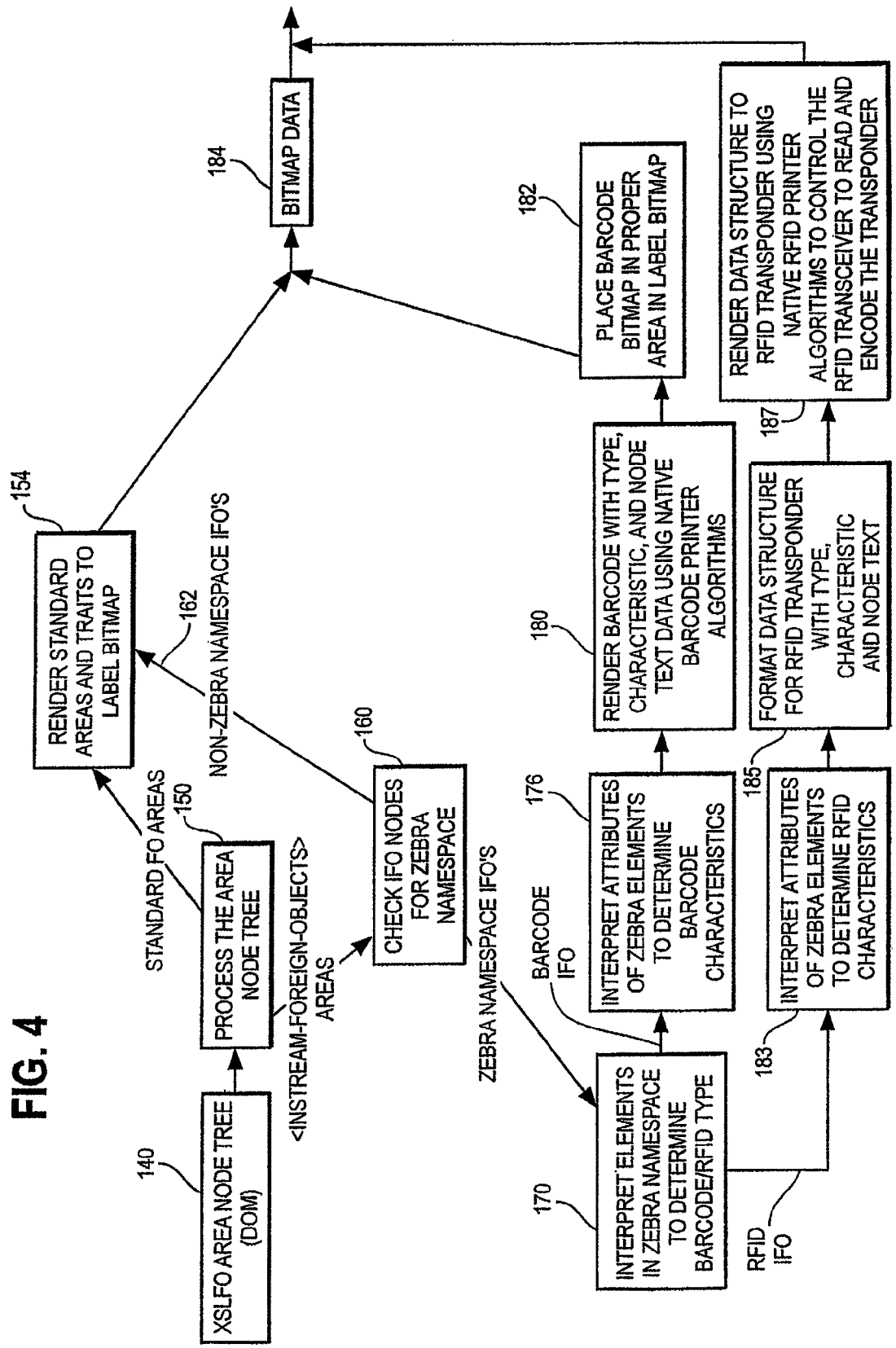
FIG. 4 is a high-level software block diagram of a specific embodiment of a bitmap/barcode and/or radio frequency identification (RFID) rendering engine.

Turning now to FIGS. 2-4 in conjunction with the code segment 4, additional detail concerning the barcode/bitmap/RFID rendering engine 80 and the processing of the instream foreign objects will now be set forth. As described above, the rendering engine 80 processes each node of the XSLFO area node tree 140 generated by the XSLFO processor 78. As is known in the art, the XSLFO area node tree 140 is represented in memory as a document object model. Accordingly, multiple nodes may exist. For example, one node may contain the instream foreign object, another node may contain associated element names, another node may contain associated text data, another node may contain associated attributes, and the like.

As shown in block 150 in FIG. 4, the nodes of the XSLFO area node tree 140 are processed. In particular, the rendering engine 80 "knows" how to render or produce the actual barcode symbol or RFID encoding defined by the corresponding instream foreign object. Commercially available XSLFO processors do not "know" how to process such instream foreign objects representing barcode symbols and RFID transponders, and thus are not able to produce or render barcode symbols or encode RFID transponders. Commercially available XSLFO processors may, however, render text in an acceptable manner and may even render certain types of instream foreign objects.

If a particular node does not contain an instream foreign object, meaning that it may contain, for example, text data, then this node may be processed in a "standard" way by utilizing the processing power of the XSLFO processor 78 rather than the rendering engine 80, as illustrated in a block 154. In one embodiment, the non-instream foreign object is provided "back" to the XSLFO processor 78, or the XSLFO processor is notified that a particular node in the XSLFO area node tree 140 is suitable for processing by it.

Processing of a node in the XSLFO area node tree 140 containing a non-instream foreign object may be processed by the XSLFO processor 78, as described above. Of course, different commercially available XSLFO processors render text, for example, into different formats. For example, the XSLFO processor referred to as "XSL Formatter" available from Antenna House Corporation, as described above, renders a node into a WINDOWS "device-independent bitmap" format. The XSLFO processor referred to as "XEP" available from RenderX Corporation, as described above, renders a node into "PDF" format, and the XSLFO processor referred to as "FOP" available from the Apache Software Foundation, as described above, may also render a node into "PDF" format.

Preferably, the XML system 10 utilizes the "FOP" XSLFO processor 78 available from the Apache Software Foundation because this XSLFO processor may be configured to "call" a subroutine or other processing function when it encounters an instream foreign object that it is not capable of processing. In particular, this XSLFO processor 78 may be set to call the rendering engine software block 80 described herein, to handle the instream foreign object that it is not capable of processing.

Next, as shown in a block 160, if the node contains an instream foreign object representing a barcode or RFLD transponder, which is not capable of being processed by the XSLFO processor 78, the rendering engine 80 checks to determine if the instream foreign object has a "namespace" specific to this XML system 10. For example, the rendering engine 80 may check to determine if the namespace associated with the instream foreign object corresponds to the "Zebra Technologies Corporation namespace." The namespace notation is known in the art. This is shown in line 3 of the code segment 4 as "xmlns:bo="http://www.zebra.com/2002/XSL/Barcode">" Thus, as shown in the code segment 4, the namespace defined above is applied to any elements having a "bo" prefix. Such elements having a "bo" prefix are then only available for processing by the rendering engine 80, which "bo" prefix type elements correspond to a barcode-type instream foreign object. The XSLFO processor 78 will not "know" how to process such elements.

If the instream foreign object is not associated with the proper namespace, it is passed back to the XSLFO processor 78, assuming that it is not a barcode type instream foreign object because the XSLFO processor may be able to process some limited number of instream foreign objects. This is shown by arrow 162 from the block 160 to the block 154. Generally, however, instream foreign objects exist or are created for the specific reason that the data associated with an instream foreign object is very unique in nature (such as a barcode), and thus, many commercially available or general purpose XSLFO processors cannot process them.

Note that the commercially available XSLFO processors mentioned herein are not necessarily incapable of processing all instream foreign objects. They are, however, incapable of processing instream foreign objects corresponding to barcode symbols and RFID encoding.

Assuming that instream foreign object has the appropriate namespace, a block 170 interprets the elements in the instream foreign object to determine barcode type. For example, the instream foreign object is shown at lines 21-26 the code segment 4. More specifically, the barcode element having a prefix of "bo," indicating the correct namespace corresponding to a barcode, is shown to have a barcode type of "postnet," as shown in line 23-24 of the code segment 4, which appears as <bo:postnet interpretationline="none">08540</bo:postnet>. Note that lines 41-42 of the code segment 4 show a similar barcode element for another instream foreign object, namely, the next barcode label to be printed, which corresponds to the address of "Steven Hawking" shown in code segment 1, Any barcode type may be specified in the instream foreign object depending upon the application. The barcode type is based upon known barcode standards. For example, the barcode type is not limited to a postnet type of barcode symbol, and may be, for example, Industrial 2 of 5," "PDF 417," "UPC," and the like. The barcode "type" specifies the basic structure of the barcode symbol to be printed, such as the thickness of the bars, the ratio of the thickness of the bars to the width of the space between bars, and the like. Each specific known barcode standard is concretely defined.

Next, after the barcode type has been ascertained from the instream foreign object, the attributes of the instream foreign object are interpreted to determine the barcode characteristics, as shown in a block 176. The characteristics may modify the way in which the barcode symbol is created. For example, one attribute of the "postnet" type barcode may be seen at lines 23-24 of the code segment 4 as Interpretation-line="none" As is known in the art, Interpretation-line="none" means that no corresponding human readable text is generated along with the specific barcode symbol. Another example of an attribute associated with the barcode element may be the height of the barcode symbol, which may also b6 specified in the instream foreign object as an attribute.

Using the barcode type and the attributes obtained from the instream foreign object, the rendering engine 80 then obtains the actual node text data to be converted into the barcode symbol, as shown in a block 180. In this example, the actual barcode data is the zip code "08540," as is shown between reverse angled brackets (>80540<) in line 24 of the code segment 4. The physical conversion from the numerical data "80540" into the bitmap representing the lines or bars of the barcode symbol (for a linear barcode, for example) may be performed by software routines contained in, for example, the barcode label printers commercially available from Zebra Technologies Corporation. Such suitable barcode printers may, for example, be models Xi series barcode printers, 90XiD1 Plus, 96XiM Plus, 140Xii11 Plus, 170XiD1 Plus, 220Xi111 Plus, the 2800 Series barcode printers, model Z4M, Z6M, 105SL barcode printers, Model R4 Mplus, R402, R-140 printer/encoders, and the like. Such known software routines or algorithms contained in the barcode printers commercially available from Zebra Technologies, Corporation are very efficient, and thus the barcodes are rendered quickly.

For linear barcodes, the bitmap is rendered by converting the text data to a series of dark and light bars whose relative widths conform to the industry specifications for the barcode symbology. The text data may have check characters added before encoding to allow verification of the barcode when it is read by a barcode scanner. The check characters may be required or may be optional depending upon the symbology. The bars may be grouped into modules of bars depending upon the requirements of the encoding of the symbology. The text data may be compressed during encoding depending upon the symbology. The bars may be preceded and/or followed by one or more "finder" bars as defined by the symbology specifications, which allow a scanner to locate the barcode data more easily.

Other algorithms may be applied as needed for the proper encoding and proper physical dimensions required by the symbology. The height of the bars, the width of the narrow bar, the ratio of the wide bar to narrow bar, and other symbolOgy specific parameters may be specified by attributes in the XML data. In addition, the barcode bitmap may be rotated (usually in ninety degree increments) as specified by attributes in the XML data.

For two-dimensional barcodes, the bitmap is rendered by converting the text data to a bit pattern according to the various unique symbology algorithms. Two-dimensional barcodes typically allow for encoding of more text data than linear barcodes. The encoding algorithm may include, for example, data compression, error checking and correction, varying levels of data redundancy, modularization, finder patterns, and other algorithms as defined by the symbology. The user-specifiable symbology specific parameters may be specified by attributes in the XML data. The bitmap generated by the symbology algorithm may then be magnified and/or rotated as specified by attributes in the XML data.

Once the bitmap representing the barcode symbol has been generated by the block 180, that bitmap is then placed into or merged with the "master" or "label" bitmap 184, which label bitmap represents the image of the entire shipping label, as shown in a block 182. The shipping label contains the human readable text, other text or characters, and the barcode symbol. Note that the aforementioned bitmaps may be separate, i.e., bitmaps for text and a bitmap for the barcode symbol, or one master bitmap may be used or "populated" as processing progresses. In that regard, note that the tree or data structure upon which the rendering engine 80 operates is referred to as the "XSLFO area node tree," meaning that it contains different "areas." Such areas may correspond to different or individual bitmaps or bitmap portions. However, any number of suitable bitmap structures may be used. The exact structure or configuration of the bitmap, or the number of bitmaps is not relevant to the scope of the present invention.

For example, the XSLFO processor 78 when generating text, may place "its" text in one particular bitmap. Such text may correspond to the name "Albert Einstein" discussed above. Because this text will also be printed on the shipping label along with the barcode symbol, the "master" or "label" bitmap 184 will contain all of the component bitmaps. The final "master" bitmap 184 is then sent to the printer driver 54 (FIG. 1) so that the shipping label may be printed.

Figure 5:
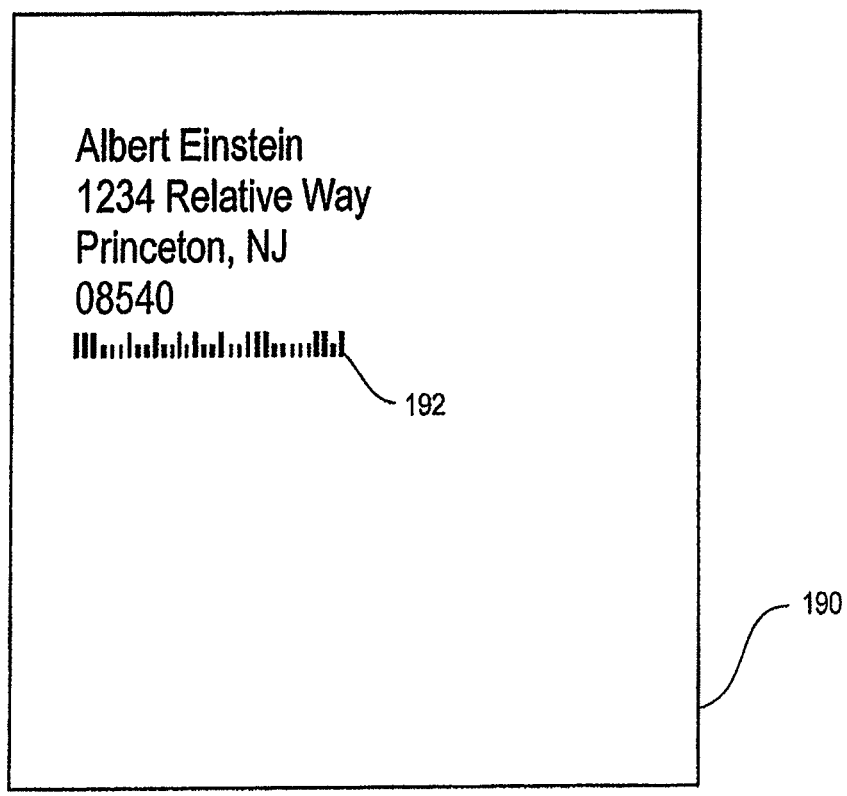
FIG. 5 is a specific representation of a barcode label produced in accordance with the XML system of FIGS. 1-4.

Turning now to FIGS. 4-5, FIG. 5 is a representation 190 of the final output of the above-described processing for the first barcode shipping label specified in code segment 1. The text data is rendered and formatted in accordance with the corresponding stylesheet, while the zip code 192 is also rendered in the form of a barcode symbol by the rendering engine 80, as described above. Note that for purposes of illustration only, the font size or font type shown in FIG. 5 may not be the same as that specified in the corresponding stylesheet shown in the code segment 3.

Referring back to block 170, assuming that the instream foreign object has the appropriate namespace, if the instream foreign object is not a barcode type, then block 170 interprets the elements in the instream foreign object to determine if it is an RPM type. Just like any barcode type may be specified in the instream foreign object, as set forth above, any RFID transponder type may be specified in the instream foreign object as well, depending upon the application. The RFID transponder type is based upon known RFID standards. For example, the RFID type is not limited to an ISO 15693 type of RFID encoding, and may be, for example, a Tag-it or I. Code type of RFID encoding, and the like. The RFID type specifies the basic structure of the RFID data to be encoded, such as the data storage capacity, data addressing scheme, transmit frequency, receive frequency, proprietary features such as serial numbering and data locking, and the like. Each specific known RFID standard is concretely defined, as set forth above.

Next, after it has been determined that the instream foreign object is an RFID type, the attributes of the instream foreign object are interpreted to determine the RFID transponder characteristics, as shown in a block 183. The characteristics may modify the way in which the RFID transponder is encoded, such as which block to write, whether to write-protect (lock) the block, whether to re-try write failures, positioning of the tag under the transceiver antenna during programming, and the like.

Using the RFID transponder type and the attributes obtained from the instream foreign object, the rendering engine 80 then obtains the actual node text data to be converted into the RFID transponder encoding, as shown in a block 185. For example, the actual RFID encoding may be the zip code "08540," which may be placed as ASCII characters in blocks 0 and 1 of a Tag-it transponder (since each block of a Tag-it holds 4 bytes of data). A Tag-it transponder can hold 8 blocks each with 4 bytes of data for a total of 32 bytes of user data. The physical conversion from the numerical data representing the actual MD encoded data into the form suitable for encoding into the RFID transponder may be performed by software routines contained in, for example, the printers and systems commercially available from Zebra Technologies Corporation.

For example, several barcode printer/encoders may be used, such as Model R-140 and Model 8402, and the like. Such software routines or "native algorithms" contained in systems commercially available from Zebra Technologies Corporation are very efficient, and thus the barcodes and RFID transponder encoding are rendered quickly.

Once the RFID transponder encoding has been generated by the block 185, an RFTD-specific data structure is rendered, as shown in a block 187. This block renders the RFD-specific data structure to the RFD transponder using the native RFID printer algorithms, as described above, to control the RFID transceiver 61 (FIG. 1) to read and encode the RFID transponder 62 (FIG. 2). This essentially "programs" the RFID transponder, much in the same way as a programmable memory device is programmed.

Figure 6:
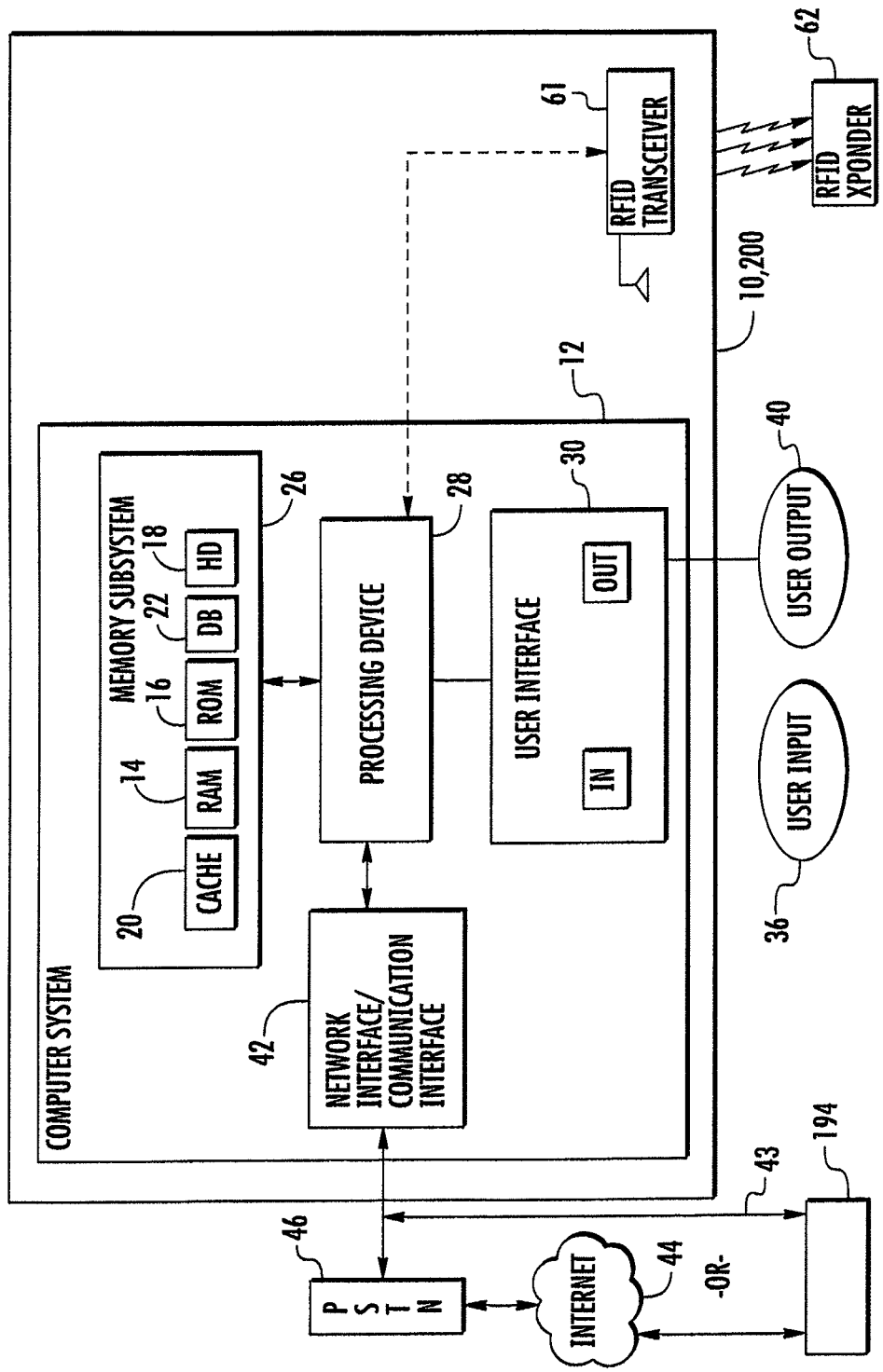
FIG. 6 is a specific example of an alternate embodiment of an XML system configured as a barcode and/or RFID rendering server.

Referring now to FIG. 6, an alternate embodiment is shown Like reference numbers are used to denote like structures. In this specific embodiment, the XML system 10 need not include or specifically utilize the XML printer apparatus in all instances. In this embodiment, for example, an external requestor 194 may desire to have an XML input data stream rendered into a bitmap so that it can print the barcode label, which may be done remotely. Alternately, the external requestor 194 may request that an RFID transponder be encoded.

Accordingly, the external requestor 194 may send a request to the XML server 200 over the Internet or other network 43, 44. The request may be in the same form as the XML input data stream described above with respect to FIGS. 1-3 and code segments 1-4. The request may also be in the form of a protocol that contains XML data, such as SOAP (Simple Object Access Protocol) as is known in the art.

In response, the computer system 12 of the XML server 200 may process the XML input data stream. All of the same processing functions described above are carried out in this embodiment, except that with respect to barcodes and the like, the bitmap is not sent to the printer driver. Rather, the bitmap is converted to any suitable format, such as "JPEG" or "PNG" format, as is known in the art. The JPEG or PNG file is then sent back to the external requestor 194, who then formats the JPEG or PNG file for the appropriate printer driver, and prints and/or displays the barcode label. With respect to RFID transponders, the encoded data may be sent back to the requestor in the form of a data file. Any suitable form or format of data file may be used. Accordingly, the present invention may function as a barcode rendering server and/or an RFID rendering server and need not necessarily directly perform the printing or encoding functions. Alternatively, the output representation of the data, may be in Scalable Vector Graphic format (SVG), which format is defined by appropriate industry standards.

Figure 7:
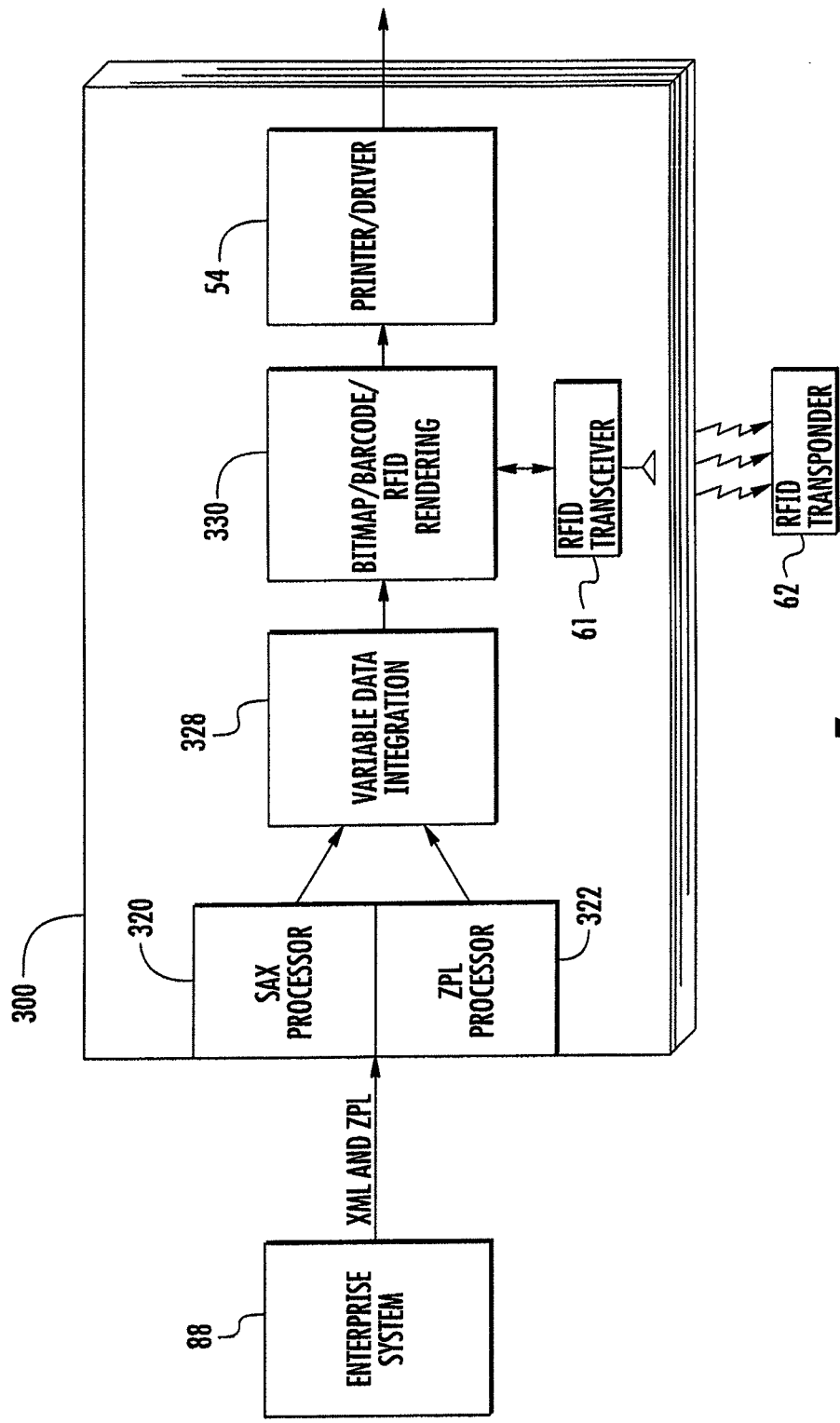
FIG. 7 is a high-level software block diagram of a specific alternate embodiment of an XML system.
Figure 8:
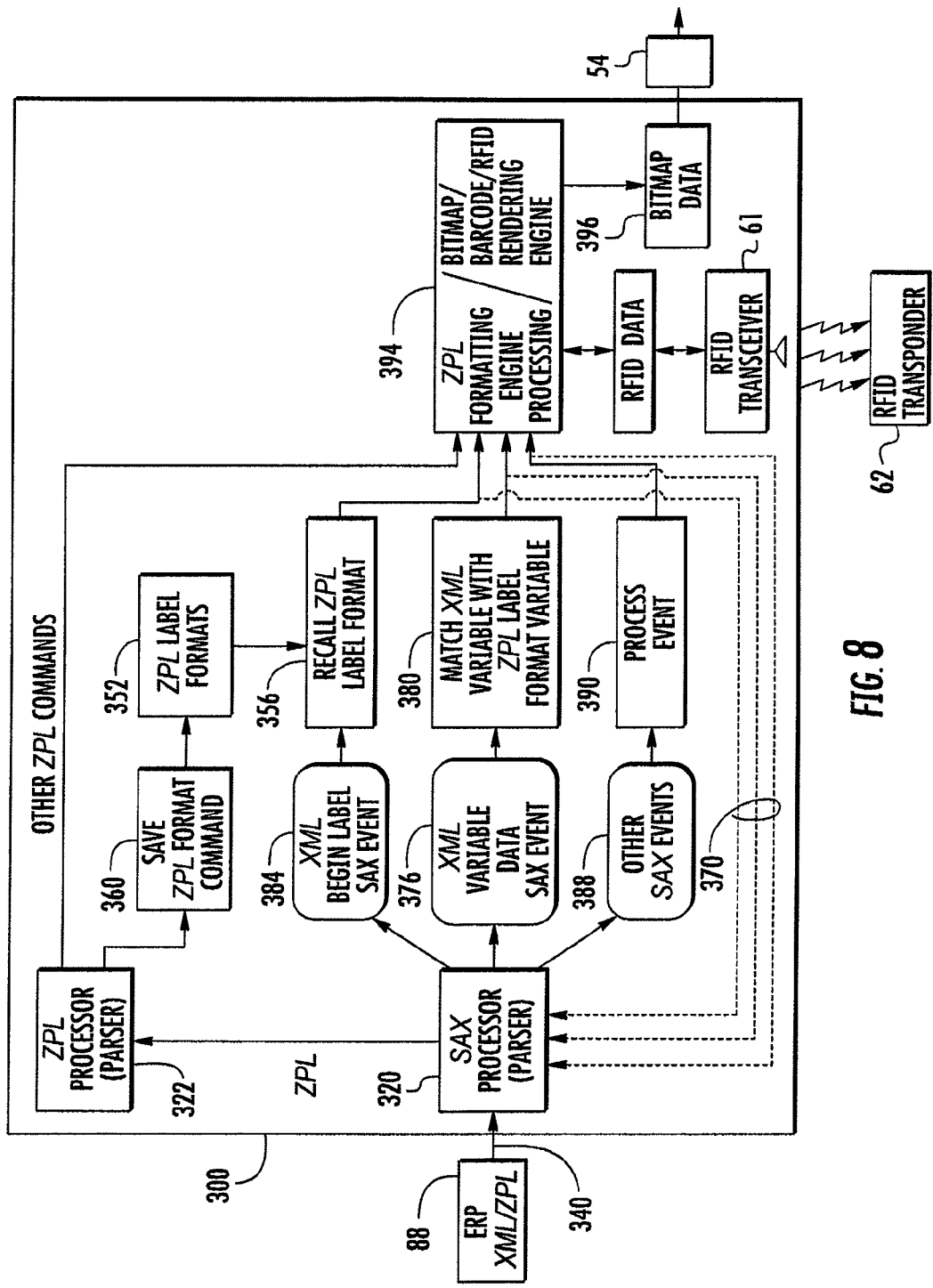
FIG. 8 is a combined high-level software block diagram and data flow diagram of a specific alternate embodiment of an XML system.

An alternate embodiment of the XML system of FIG. 1 is now shown in FIGS. 7-8, which show a "hybrid" XML system 300, rather than the "native" XML system 10 shown in FIGS. 2-6. Note that this embodiment may still be used with the computer system 12 and printer system 50 shown in FIG. 1, and like reference numerals will be used to denote like structure or components.

In this embodiment, the hybrid XML printer system 300 may receive XML data that is based on ZPL data templates, which templates conform to the ZPL language (Zebra Programming Language), such as ZPL I and/or ZPL II, and any variants thereof. The ZPL language is a formatting language that, uses the "caret" character and a two-letter command code to define a command. For example, the "AXA" command defines the start of a new label format, and the "AXZ" command defines the end of a label format.

The ZPL language also includes "tilde" commands, which represent control commands. For example, the command "-JR" is a printer reset command, which is acted upon immediately by the printer, and does not really have significant bearing on the actual formatting of a barcode label. ZPL I and ZPL II were developed by Zebra Technologies Corporation of Vernon Hills, Ill., the owner of the present invention. Note that ZPL is used interchangeably with ZPL II herein.

Figure 9:
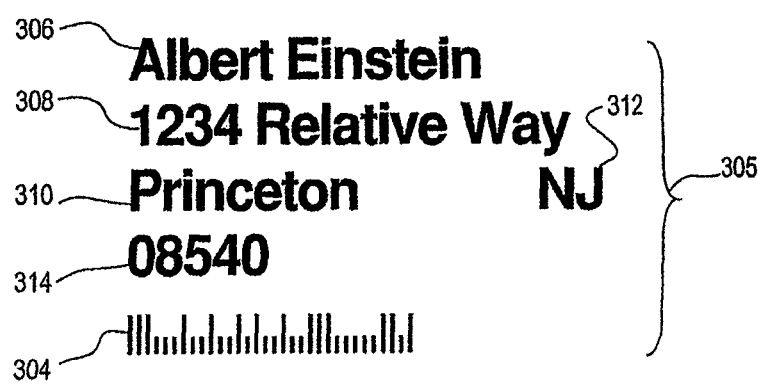
FIG. 9 is a specific representation of a barcode label produced in accordance with the XML system of FIGS. 7-8.

Greater detail regarding the ZPL language specification can be found in documents entitled "ZPL II Programming Guide Volume One: Command Reference for X.10," Manufacturer Part No. 45541LB, and "ZPL II Programming Guide Volume Two: The X.10 Environment," Manufacturer Part No. 45542LB, which documents may be found and downloaded at the Zebra Technologies Corporation website at the following Internet web address "www.zebra.com/SS/manuals.htm." The aforementioned documents are hereby incorporated by reference in their entirety. In the embodiment of FIGS. 7-9, the "language" of the printer system is a hybrid of both ZPL and XML, thus the XML system 10 may be referred to as a "hybrid XML printer."

As is known, ZPL-based printers can handle "on demand printing" and "stored label format." On-demand printing means that when a data stream containing label data to be printed is sent to the printer, it is immediately printed. Stored label format means that templates for the labels may be created in advance and downloaded to the printer. The templates may then be recalled internally within the printer to use in conjunction with a data stream transmitted at a later time that contains the label data to be printed.

As will become more clear in the description below, one difference between the native XML printer system embodiment of FIGS. 2-6 and the hybrid XML printer system embodiment of FIGS. 7-8 is that in the hybrid XML printer system embodiment, the data templates are predefined in ZPL and are first downloaded to the printer. Also note that the hybrid embodiment of FIGS. 7-8 is not a combination of the native XML printer system of the embodiment of FIGS. 2-6 with a known ZPL printer. It is not a "two-in-one" printer that merely switches between a native XML mode and a ZPL mode.

The hybrid XML printer system of FIGS. 7-8 is different from the native XML printer system of FIGS. 2-6 in which XSLT is used to define and layout the label in conjunction with XSL formatting elements embedded in the XSL template. To handle the layout and formatting of a label in the embodiment of the native XML printer system of FIGS. 2-6, a company (or vendor) must prepare and define a label layout using XSL formatting Objects, and in many situations, must also prepare XSL stylesheets and XSL schema, as set forth above in the native XML printer embodiment. If the business entity's ERP system 88 was able to transmit well-formed XML data using XSL formatting objects and the like (i.e., XSL style sheets and schema) in the first place, then there would be no need to use the ZPL templates, which would indicate that the business entity already made the complete switch to a fully compatible XML ERP system, thus obviating the need for any form of ZPL.

Some companies, however, may not be ready or willing to make the investment to such a "full conversion" of its system into "pure XML" because such companies may have a sizeable investment in the older ZPL templates for their labels to be printed. Many companies are building infrastructure to permit XML data to be easily passed from business process to business process because transmission of such data in XML compatible format is becoming the industry standard. Although many companies, and the industry as a whole, are moving in the direction of using XML format for data, such companies may not want to scrap their investment in their template database infrastructure just to make the switch to a fully compatible XML format.

Accordingly, the hybrid XML printer embodiment of FIGS. 7-8 permits use of existing ZPL templates with data in XML format. The ERP system 88 may continue to use the existing ZPL templates because the "complete" switch to well-formed XML has not yet been made, most likely for economic reasons. Thus, XSL stylesheets, schema and formatting objects have not yet been implemented at the ERP site, and the hybrid XML printer system provides a cost-effective solution in such environments.

Turning now to FIG. 7 and code segment 5, the code segment shown immediately below entitled "code segment 5—a ZPL downloadable template" shows a specific example of a ZPL format template that may be transmitted to the hybrid XML printer system 300 prior to the printing of an actual bar code label, and which may be saved in the memory of the printer system for future printing jobs. Line numbering has been inserted for purposes of illustration only and is not part of the code.

Code Segment 5 -- a ZPL downloadable template

```
 1   ^XA
     ^DFE:SHIPLABL.ZPL^FS
     ^MCY
     ^LRW^FWN^CFD,24^LH0,0
 5   ^CIO^PR2^MNY^MTT^MMT^MD0^JJ0,0^PON^PMN
     ^LT0
     ^A0N,58,58^FO188,169^CI0^FN999^FDname^FS
     ^A0N,58,58^FO188,244^CI0^FN998^FDaddress^FS
     ^A0N,58,58^FO188,319^CI0^FN996^FDstate^FS
10   ^A0N,58,58^FO657,319^CI0^FN996^FDstate^FS
     ^A0N,58,58^FO188,394^CI0^FN995^FDzip^FS
     ^BY4,FO188,488^BZN,35,N^FN995^FDzip^FS
     ^PQ1,0,1,Y
14   ^XZ
```

As is known in the art, the commands shown at lines 1 and 14 ("XA, "XZ) define the beginning and end of the template, as is specified in the ZPL language. Line 2 indicates that the format template downloaded to the hybrid printer system 300 is stored in the memory of the hybrid printer at a location defined by "E:SHIPLABL.ZPL," where "E:" represents a storage device identifier, which may be, for example, a disk drive. However, any suitable storage device may be used. The inclusion of this command indicates that this format template is to be saved. Lines 3-6 represent some of the various printer setup and initialization commands provided for by the ZPL programming language.

Referring now to line 7, the ""AO" command with an associated parameter of "N" means that a text field is to be created using font number zero, and in a normal ("N") orientation (i.e., the font is not rotated), where "58, 58" represents the height and width (in dots) of the text that will be printed. As provided for in the ZPL language, the command "AF0188, 169" defines the field origin so that the text will be positioned at coordinates 188, 169 (i.e., 188 dots across and 169 dots down from the beginning of the label).

The field number command "AFN999" (FN command with the parameter of "999") defines a variable field, which will contain variable information to be downloaded to the printer at a later time. In that regard, this is somewhat different than in standard ZPL. In standard ZPL, when an ""FN" command in a template is received, no data is supplied along with the command because when the template is later recalled, a subsequent ""FN" command is sent that specifies the location of that variable data, followed by the data itself. In this hybrid embodiment, however, certain "association" data is provided immediately following the ""FN" command, as indicated by the "FD" field data command. In this specific example, the data immediately following the ""FN" command, but preceded by the "FD" field data command, is shown as "name," which is the data that will be matched with the XML data sent from the ERP or warehouse system at a later time. Thus, when the template shown in code segment 5 is received by the hybrid XML printer system 300, it is stored in memory of the printer, and additionally, the "association" between "name" and field "999" is stored.

Similarly, on line 8, the association between "address" and field 998 is stored, on line 9, the association between "city" and field 997 is stored, and so on. Note that the fields represented by, for example, "name," "address," "city," and the like, are not the.actual data to be sent as XML data by the ERP system 88. Rather, "name," "address," and "city" are "tags" or "associations" that associate the data that will later be sent by the ERP system with the field location or identifier, namely, "999," "998," and "997," respectively.

Turning now to line 12, the "BY" command defines default parameters for barcode commands which follow it. In this case the parameter of 4 defines the narrow bar width to be 4 dots. The "AFO" command defines that the barcode to be printed will be placed at coordinates 188, 488. The "ABZ" command defines a barcode, which is a postnet type of barcode format, with normal orientation (parameter of N), height of 35 dots (parameter of 35), and no human-readable interpretation line (parameter of N). Further, the "FN" command with a parameter of 995 specifies the association between the label field identified as "995" with name of the XML data to be downloaded, which is defined by the data command "AFD" having an attribute of "zip," which further specifies that "zip" is the name of the XML data to be downloaded to create the actual printed barcode. The actual barcode that is printed is the zip code 304, as shown in FIG. 9.

Of course, text fields are printed on the barcode label 305 as well as the barcode itself 304, as shown in FIG. 9. Such fields may include, for example, a name 306, address 308, city 310, state 312, and text zip code 314.

Thus, in this embodinient, the template shown in code segment 5 is stored in the hybrid XML printer system 300, and no real "work" is performed (i.e., a label is not yet printed). In summary, lines 7-11 define text fields and line 12 defines a bar code that are defined along with associations that will be correlated with actual XML data sent from the ERP system 88 at a later time, along with other parameters, as set forth above. The template of code segment 5 may define which fields are static and which fields are variable. The variable fields have a variable name (stored in the ^FD command), which may be later correlated or "associated" with data to be downloaded at a later time, which data corresponds to the printed label.

Thus, in the hybrid embodiment of FIGS. 7-8, the "AFD" command (i.e., followed by "name") determines the name of the variable that will be sent in the actual XML data that eventually follows the downloading of the template, rather than the actual data that will be printed on the barcode label.

To see how the format template of code segment 5 above is used in operation, code segment 6 is shown immediately below, and is entitled "code segment 6—downloaded XML data for use with a ZPL template." Line numbering has been inserted for purposes of illustration only and is not part of the code.

---

Code Segment 6 - downloaded XML data for use with a ZPL template

```
1  <?xml version="1.0" encoding="UTF-8"?> <,DOCTYPE labels
   SYSTEM "label.dtd"> <labels _FORMAT="E:SHIPLABL.ZPL"
   _QUANTITY="1" _PRINTERNAME="Printer 1"
   _JOBNAME=ULBL101">
5  <label>
       <variable name="name">Albert Einstein</variable>
       <variable name="address">1234 Relative Way</variable>
       <variable name="city">Princeton</variable>
          <variable name="state">NJ</variable>
10     <variable name="zip">08540</variable>
       </label>
   <label>
       <variable name="name">Steven Hawking</variable>
          <variable name="address">5678 Black Hole Drive</variable>
15     <variable name="city">Los Angeles</variable>
       <variable name="state">CA</variable>
          <variable name="zip">90007</variable>
   </label>
       <label>
20     <variable name="name">Richard Feynman</variable>
       <variable name="address">90 Quantum Circle</variable>
          <variable name="city">New York</variable>
       <variable name="state">NY</variable>
       <variable name="zip">10044</variable>
25 </label>
   </labels>
```

---

Code segment 6 represents the actual XML data stream that the ERP system 88 or warehouse management system would send to the hybrid XML printer system 300, but after the format template of code segment 5 was first downloaded to the hybrid XM1. printer system. In the specific example of code segments 5 and 6, the warehouse management system that may be used, for example, is an Oracle warehouse management system (the "Oracle system" or "Oracle WMS"). Of course, any business system may be used, such as Oracle, SAP, and the like. In this specific example, the Oracle system gathers data from its database and formats the data in a particular XML format for transmission to the printer. Because this specific example uses the Oracle system, the template of code segment 6 uses Oracle XML semantics.

In that regard, the particular XML semantics used by the Oracle warehouse management system is defined in line 2 of code segment 6 by the "DTD" or document type definition, which is identified as "label.dtd," as is known in the art. Also, as is known in the art, the ERP system 88 or Oracle system has the capability of specifying the format in which the XML data is to be printed. By way of background, this capability may have been originally built into the Oracle system and other ERP systems because such systems were designed to interface to a custom "middleware" software system, which handled the format conversion between the Oracle or ERP system and the particular barcode printer in use. The present hybrid printer eliminates the need for such a "middleware" system.

However, the XML data transmitted by the Oracle system specifies on line 3 of code segment 6 that there is an XML element called "labels," which has an attribute called "._FORMAT." This attribute specifies the particular format template to use. In this specific example, the format template to use with the transmitted XML data is identified as "E:SHIPLABL.ZPL," which is the format template previously stored in the hybrid XML printer system 300, as shown in code segment 5, and which is a ZPL based format template. Thus, the format template previously downloaded and stored in the memory of the hybrid XML printer system 300 may be recalled from a location specified by "E:SIIIPLABL.ZPL." Line 3 also contains some additional attributes of the "labels" element, such as "QUANTITY," "_PRENTERNAME," and "_JOBNAME." The attribute "_QUANTITY," specifies the number of barcode labels to print, while the attributes "_PRINTERNAME," and "JOBNAME" are legacy fields not needed by the hybrid XML printer system 300, but are nonetheless included in the Oracle data because such data was originally created to interface to the middleware software, as described above.

The code segment 6 contains three groups of "label" data, as shown at lines 5-11, 12-18, and 19-25, respectively. Note that the three groups of "label" data appear to be similar to code segment 1, namely lines 8-14, 15-21, and 22-28 respectively, because both code segments refer to "Albert Einstein," "Steven Hawking," and "Richard Feynman," respectively, and have associated fields for address, city, state, and zip code data. Accordingly, the data shown in code segment 6 corresponds to three individual labels to be printed. Note, however, that for each of the three labels to be printed, all of the addressee information is printed as text, but only the zip code field is printed as an actual barcode. This is because of the "ABZ" command defined in template of code segment 5, line 12.

Referring to code segments 5 and 6, the data transmitted by the Oracle system shown in code segment 6 is then associated with the corresponding format template shown in code segment 5. For example, in line 6 of code segment 6, the variable name of "name" corresponds to "Albert Einstein," which is the actual XML text data. Using the previously saved template of code segment 5, an association is made between "name" (the contents of which are "Albert Einstein") and the field number "999," as shown in line 7 of code segment 5. The XML data "Albert Einstein" is then saved in memory defined by the field number 999.

Similarly, the XML data "1234 Relative Way" is saved in memory defined by the field number 998, the XML data "Princeton" is saved in memory defined by the field number 997, the XML data "NJ" is saved in memory defined by the field number 996, and so on. Once all of the data contained in the XML data input stream have been associated with the corresponding template and have been loaded into memory, the label is printed.

Turning now to FIGS. 7 and 8, FIG. 7 shows a high-level functional block diagram of a specific embodiment of the hybrid XML printer system 300, while FIG. 8 illustrates a combined high-level software block diagram and data flow diagram of a specific embodiment of the hybrid XML printer system. The hybrid XML printer system 300 receives data from the enterprise resource planning (ERP) system 88, as described above with respect to the native XML printer system. The data may contain both XML components and ZPL components, such as XML, data and/or the ZPL template data.

The high level blocks of FIG. 7 illustrate use of a SAX processor 320, which is a type of XML processor. By way of background, a SAX processor (Simple API for XML) does not use the DOM processing model (._Document Object Model) used by the XML processors described above with respect to the native XML printer system of FIGS. 2-6.

As described above, DOM-based XML processors create a node tree in memory in order to carry out its processing steps, as is known in the art. This is necessary when performing XSL type processing, as described above with respect to the embodiment of FIGS. 2-6. Accordingly, all data is stored in memory, and thus may occupy a large amount of memory. A SAX processor, however, interprets XML syntax and data streams, and rather than building a node tree in memory, it creates "events" that are handled by event handlers, as is known in the art. SAX processors are very memory efficient, which is desirable when processing large amounts of XML data.

In this alternate embodiment of FIGS. 7-8, however, XSL-type processing is preferably not performed, hence processing based on node trees in memory is not required. Accordingly, rather than using an XML processor that is strictly DOM-based, a SAX processor may be used, as shown in FIG. 7. The term "SAX" merely refers to a specification regarding how to handle data and syntax of the XML language. For example, a commercially available XML processor that may be used in this embodiment is the "Expat" XML processor available from That Open Source Software Center, Ltd. Although this specific model of XML processor has the capability to function as both a DOM-based XML processor or a non DOM-based SAX processor, for purposes of this embodiment, the processor is preferably configured as a non-DOM-based XML processor, and thus will be referred to as the SAX processor. However, any suitable DOM-based or non DOM-based XML processor may be used.

As shown in FIG. 7, in addition to the SAX processor 320, a ZPL processor 322 is also shown. The data paths from the SAX processor 320 and the ZPL processor 322 are then routed to the block labeled Variable Data Integration 328. The Variable Data Integration block 328 combines the XML data received from the ERP system 88 and applies or "associates" the data with the fields that were previously defined by the ZPL template, as mentioned above with respect to the ZPL template of code segment 5. Essentially, in this step, the actual XML data, for example, the name "Albert Einstein," is saved in its associated location defined by 999 of the template of the code segment 5, and the like.

Next, the data is rendered by a Bitmap/Barcode/RFID Rendering block 330, which processing is similar to known ZPL bitmap rendering used in known commercially available ZPL printers. For example, the following known ZPL printers, which are commercially available from Zebra Technologies Corporation of Vernon Hills, Ill., may include software, hardware, and/or firmware able to perform the ZPL bitmap/barcode processing as follows: Zebra Models Xi110+, 96XiM+, 110XiD1+, 140XiIII+, 170Xi111+, 220XiI11+, Model Z4M, Z6M, 105SL Model R4 Mplus, R402, R-140 printer/encoders, and any Model Xi series barcode printers from Zebra Technologies Corporation. Note that the Bitmap/Barcode/RFID Rendering block 330 is preferably performed without use of any XSLFO processing, which processing was required in the native XML printer system embodiment, and no XSLT stylesheets or schema may be used. However, XSLT processing and schema handling are contemplated and are within the scope and spirit of the subject invention.

Additionally, the RFID transceiver 61 may be operatively coupled to the Bitmap/Barcode/RFID Rendering block 330 to facilitate communication with the RFID transponder 62. The RFID transceiver 61 and transponder 62 may be similar to or the same as the transceiver and transponder shown and described above with respect to the embodiments of FIGS. 1, 2 and 6.

The barcodes are rendered as described above for the native XML printer embodiment, but preferably with the exception that the barcode parameters are not specified in the XML data as attributes, but rather, are preferably specified by ZPL command parameters in the format template. For example, the ZPL command "ABY2,2,100" specifies, for a linear barcode, that the narrow bar width will be 2 dots, the ratio of the wide bar width to narrow bar width will be 2, and the height of the bars will be 100 dots.

After the bitmap is rendered, it is routed to the printer driver 54, which is also shown in FIG. 1. The printer driver 54 is an example of a component described above whose function may be performed by either the processing device in the computer system 12 or the processing device 60 (FIG. 1), depending upon the physical location of the associated processing device. Again, a single processing device, if sufficiently powerful, may handle all functions for the hybrid XML printer system 300.

Referring now to FIGS. 1, 7 and 8, FIG. 8 illustrates a specific embodiment of a combined high-level software block diagram and data flow diagram. The software described below may be executed by the processor 28 of the computer system 12 of FIG. 1. Again, the processor 28 may perform functions common to both the computer system 12 and the printer system 50. There may be one or more processors, which may function in concert or which may function separately. It is not material to the scope of this invention whether the processing or processing functions are performed by or in the computer system or by or in the printer system.

As will be described below, multiple "passes" through the processing steps shown in FIG. 8 may occur under control of the SAX processor 320. However, such multiple "passes" are not necessarily linear and thus, an exact path shown by specific lines or arrows in FIG. 8 may not necessarily be shown. An interative process is described that may not have an exact beginning and ending point shown on FIG. 8. Rather, an action or result generated by the pass may be shown, and thus an "alternative path" may be shown in FIG. 8 in dashed lines that returns processing control back to the SAX processor 320. This is a shorthand way of indicating that the path may be iterative and that the SAX processor 320 may loop or iterate many times before processing reaches its end.

For purposes of illustration only, in a first "pass" through the processing illustrated in FIG. 8, a ZPL template is first sent to the hybrid XML printer system 300, where the actual data to be printed is not yet sent. In a second "pass," as will also be described below, the XML data representing the barcode label to be printed is sent to the printer system, to be printed in accordance with the ZPL template previously saved.

As shown in FIG. 8, a data input stream 340 is received from the ERP system 88, and as described above, may contain XML data and/or ZPL template data. The SAX processing block 320 initially receives and parses the data input stream 340. Note that the SAX processing block 320 is actually performed by an XML processor because a SAX processor is an XML processor operating in a SAX mode. Thus, the phrase XML processor or XML processing block may be interchanged with the phrase SAX processor or SAX processing block. However, as described above, the XML processor preferably operates in SAX mode, and is thus referred to as the SAX processor 320.

First, the SAX processing block 320 determines whether the data input stream 340 is well-formed XML data by applying standard XML syntax rules to the data input stream. Note that the SAX processing block 320 of FIG. 8 is essentially the same as the SAX processor of FIG. 7 with FIG. 7 showing some hardware and FIG. 8 showing data flow. The terms SAX processor and SAX processing block will be used interchangeably herein.

If the SAX processing block 320 determines that the data input stream does not conform to XML syntax, then it is assumed that the data input stream is ZPL based. Accordingly, the SAX processing block 320 routes the data input stream 340 to the ZPL processing block 322 for further processing. Note that the ZPL processing block 322 of FIG. 8 is essentially the same as the ZPL processor of FIG. 7 with FIG. 7 showing some hardware and FIG. 8 showing data flow. The terms ZPL processor and ZPL processing block will be used interchangeably herein.

The ZPL processing block 322 then processes or parses the data input stream 340, which represents the ZPL format template. Preferably, the ZPL processing block 322 receives a "beginning of label" command (AXA), which causes it to begin processing the format template. The format template is shown in the code segment 5.

Various ZPL commands govern the processing and define the fields of the label, essentially establishing and defining the data to be printed. Printer control and other commands may be received at this stage of processing. When all of the format template has been downloaded, the ZPL processing block 322 encounters an "end of label" command (AXZ), which causes the format template to be saved. Note that the ADF command with the corresponding identifier "E:SHIPLABL.ZPL," (shown at line 2 of code segment 5) indicates to the ZPL processing block 322 that the format template is preferably saved internally in the printer system on the "E:" device in a file named "shiplabl.zpl." Of course, the format template need not be saved internally in the printer system and may be saved at any storage location, such as on a networked server or a remote location accessible through a communication network.

The ADF (Download Format) ZPL command indicates that the label format of which it is part is to be stored rather than immediately printed. The save actually takes place when the AX2 is encountered which indicates that all template data has been received.

Also note in FIG. 8, a block labeled "ZPL label formats" (352) represents a data store. This indicates that the template data coining from the input stream is stored in a data store. The line exiting the data store 352 indicates that at some later time the data is retrieved from the data store for additional processing. The data flow path is from the block 360 to the store to the block 356, but this does not represent the actual "control flow," which is not a linear flow.

Although a block labeled "recall ZPL label format" 356 is shown connected to the block labeled "save ZPL label format" 360 as mentioned above, processing may not be linear, and thus data flow may not necessarily continue or flow from the "save ZPL label format" block 360 to the "recall ZPL label format" block 356. Rather, the entire process is iterative as described above, and in this initial "pass," after the ZPL label format is saved, as shown in the block 360, control of the input data stream may revert back to the SAX processing block 320 for continued processing, as shown by dashed lines 370. If there is no additional data in the data input stream 340 to be processed, processing terminates and awaits additional downloaded data.

In a second "pass" through the processing illustrated in FIGS. 7-8, the ERP system 88 may transmit the actual XML data, which will be processed by the hybrid XML printer system 300 in accordance with the previously downloaded ZPL template. For example, the SAX processing block 320 may receive well-formed XML data, which may specify that label data is to follow. To process the actual data, the stored ZPL format is recalled, as shown in the block labeled "recall ZPL label format" 356, so that the recalled format template may be used in conjunction with the incoming XML data stream.

The SAX processing block 320 processes the XML syntax and determines various elements and attributes defined by the data input stream 340. In this embodiment upon receiving a "_FORMAT" attribute, the data input stream 340 is temporarily interrupted and input data comes from the format template stored in the printer system 300, and thus the ZPL commands embedded in the format template are interpreted by the ZPL processing block 322. Once the commands in the format template have been interpreted, the data input stream 340 again becomes the SAX processing block 320, which continues to process the XML data.

Additional passes through the processing under control of the SAX processor 320 may cause various "events" to be initiated, as described above. For example, a "variable data SAX event" 376 may be initiated so that the various fields in the format template are populated with the corresponding or "associated" XML data being received. This is shown by the block labeled "Match XML variable with ZPL label format variable" 380. Essentially, the variables in the XML data input stream 340 are associated with the fields in the format template. For example, in this step, the XML variable, such as the actual XML data "Albert Einstein" (306 of FIG. 9) shown in code segment 6, is matched with the ZPL label format variable, such as the label variable "name" in the ZPL template of code segment 5.

The SAX processor 320 may initiate further events to handle the tasks described above, such as a "begin label SAX event" 384, and "other SAX events" 388. This pass or other passes through the processing of FIG. 8 under control of the SAX processor 320 may cause the generation of "other SAX events," which may be processed by a block labeled "Process event" 390. For example, such "other" events may include "set printer speed event," "set quantity of labels to print event," "select media event," "select ribbon to use event," "choose paper event," "use 300 dpi printer event," "use 600 dpi printer event," "variable data event," and the like.

The number of such events are virtually unlimited, and are governed by the type, configuration, and capability of the hardware printer system. Essentially, all aspects and functions of the printer may be controlled by use of codes sent in the data input steam 340. This also allows the printer to determine if it is capable or configured to print the label described by the XML data stream, and to optionally return error information if it cannot. Although in code segment 6 corresponding to the Oracle-base XML data, only a limited number of "other commands" are shown (namely, quantity=1 and printer name=printer 1, both shown on line 3), essentially, any function or feature that may be controlled in the printer may be specified in the XML input data stream, as mentioned above. Thus, there may be a close binding between the actual XML input data and printer control codes.

Also note that such "other" commands and corresponding "other events" generated by the SAX processing block 320 in response to the commands are not part of or specific to the Oracle system, meaning that the Oracle system does not necessarily "know" what these commands do or how they are used. It is only when such downloaded commands are matched during SAX processing that the commands and subsequent generated events take on meaning.

When an "end of label element" event (</label>) is received, the label is complete and now may be printed. Control is then routed to a ZPL formatting engine processing 394, which causes the label to be printed. Preferably, the function of the ZPL formatting engine processing 394 includes the function of bitmap/barcode/RFB) rendering. Thus, the block 394 will be referred to as the ZPL formatting engine, This combined function determines the bitmaps for each of the text, barcode, and other fields on the label, integrates the individual bitmaps with proper rotation and magnification into a single label bitmap 396, and sends the completed label bitmap to the print engine (or printer driver 54, FIG. 1) for physical rendering on media. As described above, the ZPL formatting engine processing 394 may be found in various commercially available ZPL printers, such as for example, in printers commercially available from Zebra Technologies Corporation of Vernon Hills, Ill., which may include the following printer models: XiBT+, 90XiD1+, 96XiD1+, 140XiM+, 170XiM+, 220XiM+, Model Z4M, Z6M, 105SL Model R4 Mplus, R402, R-140 printer/encoders, and any Model Xi series barcode printers.

The ZPL formatting engine processing 394 essentially determines all of the fields contained in the label to be printed and determines what must be done for each field. For example, the ZPL formatting engine processing 394 may determine that the field containing the data "Albert Einstein" (306 of FIG. 9) shown in line 6 of code segment 6 is printed using font number zero and in a normal ("N") orientation, and is 58 'dots in height and 58 dots in width, and begins at a field origin coordinate of 188, 169, as indicated by line 7 of the code segment 5.

Thus, the ZPL formatting engine processing 394 inspects all of the fields defined by the format template in conjunction with the corresponding XML data and essentially determines how to create dots (or bits) on the label that represent the text or barcode. Barcode fields are formatted and rendered by applying the appropriate bitmap generation algorithm to the field parameters based upon the barcode symbology specified for the field accounting for horizontal and vertical sizing of linear barcodes and magnification of two-dimensional barcodes.

Also, the RED transceiver 61 may be operatively coupled to the ZPL formatting engine processing 394 to facilitate communication with the RFID transponder 62. The RFID transceiver 61 and transponder 62 may be similar to or the same as the transceiver and transponder shown and described above with respect to the embodiments of FIGS. 1, 2, 6 and 7.

Turning now to code segment 7, the code segment shown immediately below entitled "code segment 7—a ZPL downloadable template with RFID and data logging commands" shows code segment 5 with certain RFID and data logging commands added. The added code will cause reads from and writes to the RFID tag, and logging of the RFID data to a host computer. Line numbering has been inserted for purposes of illustration only and is not part of the code.

Code Segment 7 -- a ZPL downloadable template with RFID and data logging commands

```
1   ^XA
      ^DFE:SHIPLABL.ZPL^FS
      ^LXE:LOG04128.XML^FS
      ^MCY
5   ^LRW^FWN^CFD,24^LH0,0
      ^CIO^PR2^MNY^MTT^MMT^MD0^JJ0,0^PON^PMN
      ^LT0
      ^AON,58,58^FO188,169^CI0^FN999^FDname^LX^FS
```

Code Segment 7 -- a ZPL downloadable template with RFID and data logging commands

```
      ^AON,58,58^FO188,244^CI0^FN998^FDaddress^LX^FS
10  ^AON,58,58^FO188,319^CI0^FN997^FDcity^LX^FS
      ^AON,58,58^FO657,319^CI0^FN996^FDstate^LX^FS
      ^AON,58,58^FO188,394^CI0^FN995^FDzip^LX^FS
      ^BY4,FO188,488^BZN,35,N^FN995^FDzip^FS
      ^WT^FN995^FDzip^FS
15  ^AON,58,58^FO188,394^CI0^FN994^FDtagid^FS
      ^RI^FN994^FDtagid^LX^FS
      ^PQ1,0,1,Y
18  ^XZ
```

The inclusion of the write tag (AWT) command on line 14 indicates that the data specified by field number 995, indicated by the AFN field number command with a parameter of 995, is to be written to (encoded on) the RFID tag. In this example the XML data associated with field number 995 is the zip code. The actual zip code data, "08540" for the first label, will be encoded on the RFID tag.

The inclusion of the read unique tag id ("RI") command on line 16 indicates corrected/mjcthat the tag id number is to be read from the tag and associated with an XML variable named "tagid," as specified by the "FD with a parameter of "tagid" on line 16. In addition, the data read from the tag is associated with field number 994 ("FN command with a parameter of 994). Since the text field on line 15 also has a field number of 994, the tag id which is read from the RFID tag will be printed as text on the label in location 188, 394.

The inclusion of a new ZPL command, "log in XML" (ALX), on lines 3, 8, 9, 10, 11, 12, and 16 indicates that certain field data should be saved in a data log for later transmittal to a host computer. The ALXE:LOG04128.XML command on line 3 indicates that log data for this label should be saved in a file on the a device in a file called "LOG04128.XML." The ALX commands on lines 8, 9, 10, 11, 12, and 16 indicate that the data associated with those fields should be saved in the log with the previously specified name. For example, when the ALX command on line 8 is processed, the data associated with the "name" field will be logged. The actual data to be logged for the first label is "Albert Einstein" as shown on line 6 of code segment 6. The data logged for the ALX on line 16 is the unique tag id read from the tag. For the purposes of this example, assume that for the first label the unique tag id read from the tag is "1248002001."

To see how the data indicated in the format template of code segment 7 above is returned to a host computer, code segment 8 is shown immediately below, and is entitled "code segment 8 —uploaded XML data." Line numbering has been inserted for purposes of illustration only and is not part of the code.

Code Segment 8 -- uploaded XML data

```
1 <?xml version="1.0" encoding="UTF-8"?>
   <root __LOGFILE="E:L0G04128.XELi>
      <labels __FORMAT="E:SHIPLABL.ZPL" __QUANTITY="1">
         <label>
5         <variable name="name">Albert Einstein</variable>
            <variable name="address">1234 Relative Way</variable>
            <variable name="city">Princeton</variable>
            <variable name="state">NJ</variable>
            <variable name="zip">08540</variable>
         <variable name="tagid">1248002001</variable>
         </label>
```

Code Segment 8 -- uploaded XML data

```
       <label>
           <variable name="name">Steven Hawking</variable>
           <variable name="address">5678 Black Hole Drive</variable>
15         <variable name="city">Los Angeles</variable>
           <variable name="state">CA</variable>
           <variable name="zip">90007</variable>
           <variable name="tagid">1248002002</variable>
       </label>
20     <label>
           <variable name="name">Richard Feynman</variable>
           <variable name="address">90 Quantum Circle</variable>
           <variable name="city">New York</variable>
           <variable name="state">NY</variable>
25         <variable name="zip">10044</variable>
           <variable name="tagid">1248002003</variable>
       </label>
     </labels>
29 </root>
```

When the printer is requested to upload the log data, the printer forms an XML data stream similar to that shown in code segment 8. The data is very similar to the XML data sent to the printer in order to print the labels, but with some additions. A "root" element has been added so that data from more than one complete print job can be returned in the same XML stream. The name of the log file is specified in the _LOGFILE attribute shown on line 2. The data that was read from the RFID tag is included as "tagid" variables on lines 10, 18, and 26. When this data is received by a host computer, the host will know that the RFID tag with id of "1248002001" was used to identify the goods shipped to Albert Einstein. This data can be stored in a database on the host computer for later reference. Although this example is shown with the unique tag identifier, any data written to or read from the RFID tag could be reported to the host computer in a similar manner.

The hybrid printer system is not limited to the use of ZPL for the printer control and label template language. Other proprietary or non-proprietary printer control languages (PCLs) besides ZPL could be used in a similar manner as long as XML can be differentiated from the PCL.

Specific embodiments of an XML system, including a native XML printer system and a hybrid XML printer system, according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. An apparatus comprising:
    one or more processors configured to at least:
        receive an input data stream, wherein the input data stream comprises data encoded according to one of a first language and a second language, the second language being different than the first language;
        select one of the first language and the second language for formatting the data
        process formatting instructions encoded according to the selected one of the first and second languages;
        transform the data based upon the formatting instructions; and
        generate at least one of encoding information for an RFID device or a printable representation of at least a portion of a media using the transformed data.

2. The apparatus of claim 1, wherein the selected one of the first and second languages is at least one of extensible mark-up language or hypertext mark-up language.

3. The apparatus of claim 2, wherein the apparatus is an XML printer system.

4. The apparatus of claim 1, wherein the apparatus is a network server.

5. The apparatus of claim 2, wherein the one or more processors are configured to process a stylesheet, wherein the stylesheet includes an extensible style sheet language formatting object (XSLFO) for formatting the data within the input data stream and wherein the stylesheet further includes an RFID-type instream foreign object defining communication with an RFID apparatus.

6. The apparatus of claim 2, wherein the one or more processors are configured to process a stylesheet, wherein the stylesheet includes extensible stylesheet language transformation (XSLT) instructions for transforming the data in the input data stream.

7. The apparatus of claim 2, wherein the one or more processors are configured to process a stylesheet, wherein the stylesheet is contained in the input data stream or the stylesheet is retrieved from a stylesheet repository based upon content of the input data stream.

8. The apparatus of claim 2, wherein the one or more processors are configured to implement an XML processor module, the XML processor module to obtain a schema identified in the input data stream, the schema being defined to facilitate validation of a portion of the input data stream.

9. The apparatus of claim 2, wherein the one or more processors are further configured to validate at least a portion of the data according to a Document Type Definition (DTD).

10. The apparatus of claim 2, wherein the one or more processors comprise at least one SAX processor module.

11. The apparatus of claim 1, wherein the selected one of the first and second languages is Zebra Programming Language (ZPL).

12. The apparatus of claim 11, wherein the one or more processors are configured to process a ZPL format template, wherein the ZPL format template includes instructions for formatting the data within the input data stream and wherein the ZPL format template further includes a caret instruction.

13. The apparatus of claim 11, wherein the one or more processors are configured to process a ZPL format template, wherein the ZPL format template is retrieved from a memory of the apparatus.

14. The apparatus of claim 11, wherein the one or more processors are configured to process at least one tilde command.

15. A method comprising:
    receiving, at an apparatus, an input data stream, wherein the input data stream comprises data encoded according to one of a first language and a second language different than the first language, wherein the apparatus is configured to receive formatting instructions encoded according to the first language or according to the second language;
    selecting one of the first language and the second language for formatting the data;
    processing formatting instructions encoded according to the selected one of the first language and the second language;
    transforming, by a processor, the data based upon the formatting instructions; and generating at least one of encoding information for an RFID device or a printable representation of at least a portion of a media using the transformed data.

16. The method of claim 15, wherein the selected one of the first and second languages is at least one of extensible mark-up language or hypertext mark-up language.

17. The method of claim 16, further comprising processing a stylesheet, wherein the stylesheet includes an extensible stylesheet language formatting object (XSLFO) for formatting the data within the input data stream and wherein the stylesheet further includes an RFID-type instream foreign object defining communication with an RFID apparatus.

18. The method of claim 16, comprising processing a stylesheet, wherein the stylesheet includes extensible stylesheet language transformation (XSLT) instructions for transforming the data in the input data stream.

19. The method of claim 16, further comprising processing a stylesheet, wherein the stylesheet is contained in the input data stream or the stylesheet is retrieved from a stylesheet repository based upon content of the input data stream.

20. The method of claim 16, further comprising implementing an XML processor module to obtain a schema identified in the input data stream, the schema being defined to facilitate validation of a portion of the input data stream.

21. The method of claim 16 further comprising validating at least a portion of the data according to a Document Type Definition (DTD).

22. The method of claim 15, wherein the selected one of the first and second languages is Zebra Programming Language (ZPL).

23. The method of claim 22, further comprising configuring the processor to process a ZPL format template, wherein the ZPL format template includes instructions for formatting the data within the input data stream and wherein the ZPL format template further includes a caret instruction.

24. The method of claim 22, further comprising configuring the processor to process a ZPL format template, and retrieving the ZPL format template from a memory of the apparatus.

25. A non-transitory computer-readable medium having computer readable program code stored thereon, the program code being configured to, when executed, cause an apparatus to at least:
receive an input data stream, wherein the input data stream comprises data encoded according to one of a first language and a second language, the second language being different than the first language;
select one of the first language and the second language for formatting the data;
process formatting instructions encoded according to the selected one of the first and second languages;
transform the data based upon the formatting instructions; and
generate at least one of encoding information for an RFID device or a printable representation of at least a portion of a media using the transformed data.

26. The computer-readable medium of claim 25, wherein the selected one of the first and second languages is at least one of extensible mark-up language or hypertext mark-up language.

27. The computer-readable medium of claim 26, wherein the program code is configured to, when executed, cause the apparatus to process a stylesheet, wherein the stylesheet includes an extensible stylesheet language formatting object (XSLFO) for formatting the data within the input data stream and wherein the stylesheet further includes an RFID-type instream foreign object defining communication with an RFID apparatus.

28. The computer-readable medium of claim 26, wherein the program code is configured to, when executed, cause the apparatus to process a stylesheet, wherein the stylesheet includes extensible stylesheet language transformation (XSLT) instructions for transforming the data in the input data stream.

29. The computer-readable medium of claim 26, wherein the program code is configured to, when executed, cause the apparatus to process a stylesheet, wherein the stylesheet is contained in the input data stream or the stylesheet is retrieved from a stylesheet repository based upon content of the input data stream.

30. The computer-readable medium of claim 26, wherein the program code is configured to, when executed, cause the apparatus to implement an XML processor module to obtain a schema identified in the input data stream, the schema being defined to facilitate validation of a portion of the input data stream.

31. The computer-readable medium of claim 26, wherein the program code is configured to, when executed, cause the apparatus to validate at least a portion of the data according to a Document Type Definition (DTD).

32. The computer-readable medium of claim 25, wherein the selected one of the first and second languages is ZPL.

33. The computer-readable medium of claim 32, wherein the program code is configured to, when executed, cause the machine to process a ZPL format template, wherein the ZPL format template includes instructions for formatting the first data within the input data stream, and wherein the ZPL format template further includes a caret instruction.

* * * * *